US012178380B2

(12) United States Patent
Ko

(10) Patent No.: US 12,178,380 B2
(45) Date of Patent: Dec. 31, 2024

(54) DISHWASHER

(71) Applicant: LG Electronics Inc., Seoul (KR)

(72) Inventor: Myungwon Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 341 days.

(21) Appl. No.: 17/792,907

(22) PCT Filed: Jan. 20, 2020

(86) PCT No.: PCT/KR2020/000965
§ 371 (c)(1),
(2) Date: Jul. 14, 2022

(87) PCT Pub. No.: WO2021/145496
PCT Pub. Date: Jul. 22, 2021

(65) Prior Publication Data

US 2023/0062504 A1 Mar. 2, 2023

(30) Foreign Application Priority Data

Jan. 14, 2020 (KR) ........................ 10-2020-0004987

(51) Int. Cl.
*A47L 15/42* (2006.01)
*E05D 3/06* (2006.01)

(52) U.S. Cl.
CPC ....... *A47L 15/4265* (2013.01); *A47L 15/4261* (2013.01); *E05D 3/06* (2013.01); *E05Y 2900/304* (2013.01)

(58) Field of Classification Search
None
See application file for complete search history.

(56) References Cited

U.S. PATENT DOCUMENTS

2019/0133409 A1 5/2019 Marzorati

FOREIGN PATENT DOCUMENTS

| | | |
|---|---|---|
| CN | 203122330 | 8/2013 |
| CN | 110151086 | 8/2019 |
| EP | 1529482 | 5/2005 |
| EP | 2110064 | 10/2009 |
| EP | 3081136 | 10/2016 |

(Continued)

OTHER PUBLICATIONS

International Search Report in International Appln. No. PCT/KR2020/000963, dated Sep. 28, 2020, 6 pages (with English translation).

(Continued)

*Primary Examiner* — Levon J Shahinian
(74) *Attorney, Agent, or Firm* — Fish & Richardson P.C.

(57) ABSTRACT

A dishwasher includes a tub, a base disposed beneath the tub, a door for opening/closing one side of the tub, a door bracket fastened to the door and rotatably connected to the tub, a cover panel that covers the door and one side of the base, and a link module for moving the cover panel in the longitudinal direction of the door when the door is rotated. The dishwasher further includes an upper holder fastened to one side of the cover panel and movably mounted on the door bracket, and a lower holder spaced apart from the upper holder downwards, fastened to one side of the cover panel, and movably mounted on the door bracket. The door bracket includes an upper guide unit for guiding movement of the upper holder, and a lower guide unit disposed beneath the upper guide unit so as to guide movement of the lower holder.

20 Claims, 20 Drawing Sheets

(56) References Cited

FOREIGN PATENT DOCUMENTS

| | | |
|---|---|---|
| EP | 3108791 | 12/2016 |
| EP | 2407723 | 10/2017 |
| JP | H05115408 | 5/1993 |
| WO | WO2011/039225 | 4/2011 |
| WO | WO2020/101418 | 5/2020 |

OTHER PUBLICATIONS

Extended European Search Report in European Appln. No. 20913134.1, mailed on Dec. 15, 2023, 11 pages.

DISHWASHER

CROSS-REFERENCE TO RELATED APPLICATIONS

This application is a National Stage application under 35 U.S.C. § 371 of International Application No. PCT/KR2020/000965, filed on Jan. 20, 2020, which claims the benefit of Korean Patent Application No. 10-2020-0004987, filed on Jan. 14, 2020. The disclosures of the prior applications are incorporated by reference in their entirety.

TECHNICAL FIELD

The present disclosure relates to a dishwasher, and more particularly, to a dishwasher having a cover panel mounted on the front of a door.

BACKGROUND ART

A dishwasher is a home appliance used to clean contaminants, such as food residue, on dishware, cookware, and the like (hereinafter referred to as an 'object to be washed') by using high-pressure washing water sprayed from a spray arm.

The dishwasher may clean an object to be washed in an inner space of a tub. The front of the tub may be open to be covered by the opening and closing of a door, and a cover panel defining the outer shape or appearance may be mounted on the front of the door.

The cover panel may be made of various materials. A user may choose a cover panel for installation on the door in consideration of harmony and unity in interior design such as harmony with the surrounding furniture. A range of weight or load of the cover panel may vary depending on the material of the cover panel. When a material with a high density is selected, it may be difficult to keep the door open due to a load acting on the door.

In the case of a cover panel with heavy weight, a load of the cover panel is concentrated in a portion where the cover panel is mounted on the door to thereby causing a damage of the door where the cover panel is mounted on the door. Further, when the cover panel is movably mounted on the door, the load acting on the door is increased when the cover panel is moved. This may result in structural deformation or damage of the door where the cover panel is mounted on the door.

European Patent Registration EP2407723B1, which is hereby incorporated by reference, discloses a guide structure for guiding the movement of a cover panel in a portion where a panel is mounted. However, in that publication, a structure for supporting the cover panel with heavy weight by a door mounted on the cover panel is not disclosed, and thus a way to solve the problem is not provided.

As disclosed in the related art, in order to distribute a load of the cover panel, a cover panel for an upper cover door that is mounted on an outer door may be installed in addition to the outer door that is usually disposed at the rear of the cover panel. However, a control panel and the like are provided at the upper cover panel that is disposed on the outer door, the upper cover panel may have weaker strength than the outer door. In this case, when an excessive load is applied to the upper cover door, damage or warping may occur. In addition, power or dust generated in the process of producing the configuration of the upper cover door may be easily exposed to a user.

DISCLOSURE OF INVENTION

Technical Problem

It is an objective of the present disclosure to provide a dishwasher that can minimize a load acted on a door by a cover panel. That is, the present disclosure is directed to providing a dishwasher having a structure capable of distributing a load of a cover panel acting on a door or supporting the load of the cover panel.

It is another objective of the present disclosure to provide a dishwasher that can support a load of a cover panel with a simple structure.

It is yet another objective of the present disclosure to provide a dishwasher that can prevent damage and the like due to a load of a cover panel. The objectives of the present disclosure are not limited to the objectives described above, and other objectives not stated herein will be clearly understood by those skilled in the art from the following description.

Technical Solution

According to an aspect of the subject matter described in this application, a dishwasher includes: a tub defining a space in which dishes are washed and having one open side; a base disposed on a lower side of the tub and by which the tub is spaced apart from a floor surface by a predetermined interval; a door opening and closing the open one side of the tub; a door bracket fixedly fastened to the door and rotatably connected to the tub; a cover panel covering the door and one side of the base, the cover panel being movably disposed on the door; a link module by which the cover panel moves in a lengthwise direction of the door when the door is rotated; an upper holder fastened to one side of the cover panel and movably mounted on the door bracket; and a lower holder spaced downward from the upper holder by a predetermined interval to be fastened to the one side of the cover panel and movably mounted on the door bracket, wherein the door bracket includes an upper guide that guides movement of the upper holder and a lower guide that is disposed under the upper guide and guides movement of the lower holder. Accordingly, the cover panel may be moved from a front of the door, and a load or weight of the cover panel may be supported by the door bracket.

The door may include an inner door that is brought into contact with a front surface of the tub to close the open side of the tub and an outer door that is fastened to a front of the inner door. The upper guide and the lower guide of the door bracket may be disposed between the inner door and the outer door, allowing the door bracket that supports a load of the cover panel to be disposed between the inner door and the outer door.

One side of the door bracket may be fastened to the inner door, and another side of the door bracket may be fastened to the outer door, allowing a load of the cover panel to be distributed to the inner door and the outer door.

The door bracket may include a bracket front surface on which the upper guide and the lower guide are disposed, and an inner door fastening portion fastened to the inner door at an upper portion of the bracket front surface. The inner door fastening portion may extend by being bent rearward in a thickness direction of the door from one side of the bracket front surface on which the upper guide is formed, and may be fastened to the inner door, allowing a load of the cover panel to be distributed to the inner door.

A door bracket fastening groove defining a groove recessed rearward may be formed on a front surface of the inner door, and the inner door fastening portion may be inserted into the door bracket fastening groove to be fastened to the inner door, allowing the door bracket to be fixed to the inner door.

The bracket front surface may include an outer door fastening portion that is disposed between the upper guide and the lower guide, and may be fastened to the outer door, allowing a load acted on the door bracket to be distributed to the outer door.

The outer door may be provided with an upper hole that is open at a front of the upper guide in a movement range of the cover panel, and a lower hole that is open at a front of the lower guide in the movement range of the cover panel, allowing the cover panel to be freely moved to the front of the door.

The upper guide may be provided with an upper guide hole through which the upper holder moves, and the lower guide may be provided with a lower guide hole through which the lower holder moves, allowing the upper holder and the lower holder to be moved in the lengthwise direction of the door.

The upper hole may be greater in size than the upper guide hole to prevent contact with the upper holder, and the lower groove may be greater in size than the lower guide hole to prevent contact with the lower holder, thereby avoiding contact with the door when the cover panel is moved.

The door bracket may include a first door bracket that is fastened to the inner door and is rotatably connected to the tub, and a second door bracket that is connected to the first door bracket and is fastened to the outer door.

The second door bracket may include a bracket front surface on which the upper guide and the lower guide are disposed, a second bracket fastening portion fastened to the first door bracket at a lower portion of the bracket front face, and an inner door fastening portion fastened to the inner door at an upper portion of the bracket front face, allowing the second door bracket to distribute a load of the cover panel to the door and the tub.

An upper end of the second door bracket may be fastened to the inner door, and a lower end of the second door bracket may be fastened to the inner door through the first door bracket, allowing a load of the cover panel to be distributed vertically to the door.

The first door bracket may include a tub connecting portion rotatably connected to the tub at a lower end of the tub, a door fastening portion extending upward from the tub connecting portion in the lengthwise direction of the door and fastened to the inner door, and a link connecting portion disposed at a rear in a widthwise direction of the door with respect to the tub connecting portion and to which the link module that moves the cover panel is connected, thereby being rotatably connected to the tub.

The upper guide and the lower guide may be disposed to be spaced apart from each other by a vertical length of the upper guide or the lower guide or more, allowing a load of the cover panel to be distributed in a wider range.

The upper guide may be provided with an upper insertion hole into which the upper holder is inserted, and an upper guide hole that extends downward of the upper insertion hole and guides movement of the upper holder. The lower guide may be provided with a lower insertion hole into which the lower holder is inserted, and a lower guide hole that extends downward of the lower insertion hole and guides movement of the lower holder.

Details of other embodiments are included in the detailed description and the accompanying drawings.

Advantageous Effects

A dishwasher according to the present disclosure has one or more of the following effects.

First, as a guide that guides the movement of a cover panel in an up-and-down direction or a vertical direction is disposed on a door bracket that is fixed to a door and is rotatably connected to a tub, and the door bracket is fixedly disposed on the door and is disposed to be rotatable toward a tub bracket, a load of the cover panel may be prevented, through the door bracket, from being concentrated on the door, thereby securely supporting the cover panel.

In detail, as the door bracket is fixedly disposed across various parts of an inner door, an outer door, and the tub, a load of the cover panel may be distributed to thereby securely support the cover panel.

Second, an upper guide and a lower guide may be arranged vertically at one door bracket to support and guide an upper holder and a lower holder mounted on the cover panel. By adding a simple bracket structure, the load of the cover panel may be stably supported. In addition, as the door bracket extends long in the up-and-down direction, and the upper guide and the lower guide are spaced apart from each other in the up-and-down direction by a predetermined interval, allowing a load of the cover panel to be effectively distributed.

Third, in the configuration of the outer door and an upper cover panel disposed at the rear of the cover panel, the door bracket may be disposed inside the outer door, and a plurality of guides vertically spaced apart from each other may be installed at the door bracket to distribute a load of the cover panel to thereby increase structural stability. Since a guide is not separately provided at an upper cover panel made of a material having relatively weak strength, the concern of damage to the upper cover panel and the like may be addressed. The effects of the present disclosure are not limited to the effects described above, and other effects not mentioned will be clearly understood by those skilled in the art from the claims.

MODE FOR INVENTION

Figure 1A:
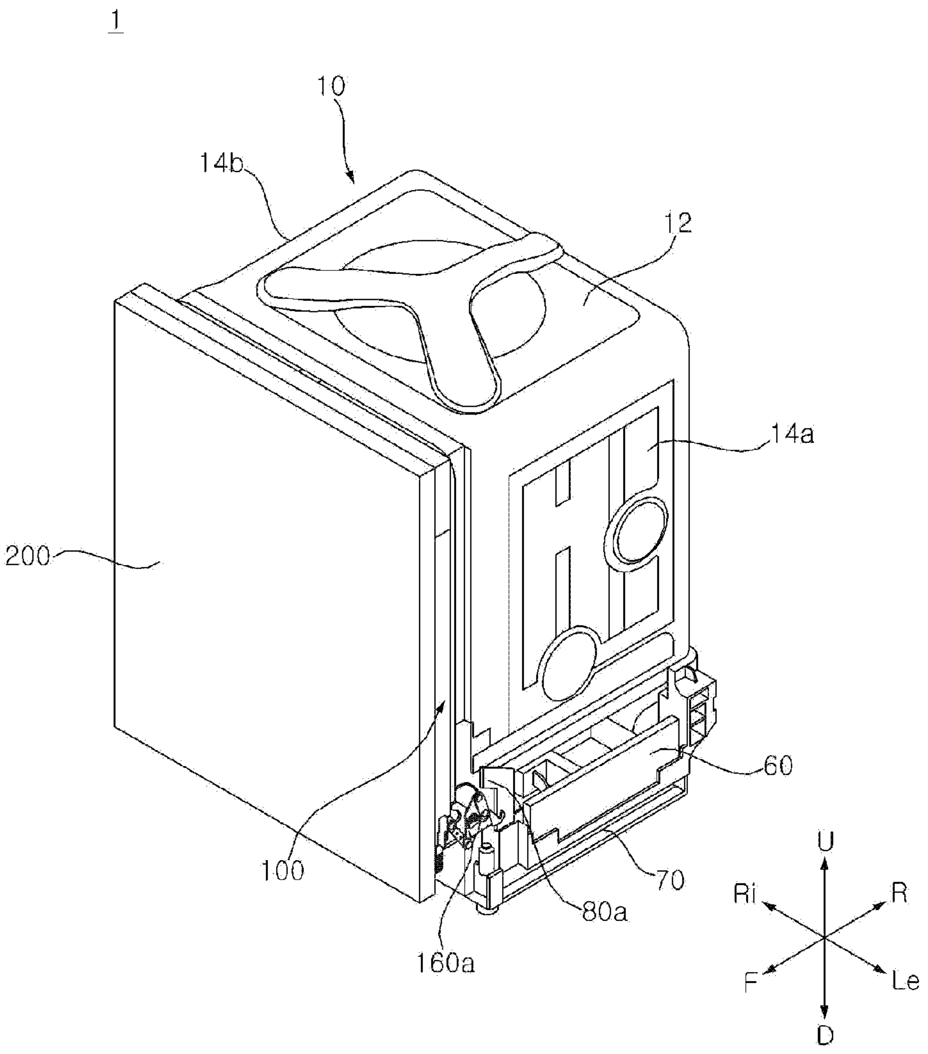
FIG. 1A is a perspective view of a dishwasher according to an embodiment of the present disclosure.

The above and other aspects, features and other advantages of the present disclosure will be more clearly understood from the following detailed description taken in conjunction with the accompanying drawings. Exemplary embodiments will now be described more fully hereinafter with reference to the accompanying drawings; however, they may be embodied in many different forms and should not be construed as limited to the embodiments set forth herein. Rather, these embodiments are provided so that this disclosure will be thorough and complete, and will fully convey the scope of the exemplary embodiments to those skilled in the art. The same reference numerals are used throughout the drawings to designate the same or similar components.

The directions "up (U)", "down (D)", "Left (Le)", "right (Ri)", "front (F)", and "rear (R)" in FIG. 1A, FIG. 5A, FIGS. 7A to 9 are defined as shown in the drawings. However, this is only for the purpose of clarity of explanation, and therefore, these directions may be defined differently depending on a reference or a basis.

Referring to FIGS. 6A and 6B, and FIG. 10A to 14, a door 100, a door bracket 160*a*, a door bracket 160*b*, and a cover panel 200 whose arrangements are changed according to the rotation of the door 100 may be described based on a longitudinal or lengthwise direction Lu-Ld of the door 100, a thickness direction Tf-Tr of the door 100, and a widthwise direction Le-Ri of the door 100. The lengthwise direction of the door 100 may refer to the up-and-down direction based on when a tub 10 is closed by the door 100. The thickness direction of the door 100 may refer to the front-and-rear direction based on when the tub 10 is closed by the door 100. Since the widthwise direction Le-Ri of the door 100 is constant regardless of a change in the placement of the door 100, the widthwise direction Le-Ri of the door 100 is the same as the left-and-right direction Le-Ri of a dishwasher 1.

These direction settings may be applied regardless of the placement of the door 100. Therefore, these directions can be applied regardless of the placement of the door 100 that is rotatably mounted on one side of the tub 10. The purpose of these direction settings is to describe the door 100 and the door brackets 160*a* and 160*b*, and therefore it does not limit the scope of the present disclosure.

Hereinafter, the present disclosure will be described with reference to the drawings for explaining the dishwasher according to embodiments of the present disclosure.

<Overall Configuration>

Hereinafter, the overall configuration of the dishwasher 1 according to an embodiment will be briefly described with reference to FIGS. 1 to 4.

Figure 1B:
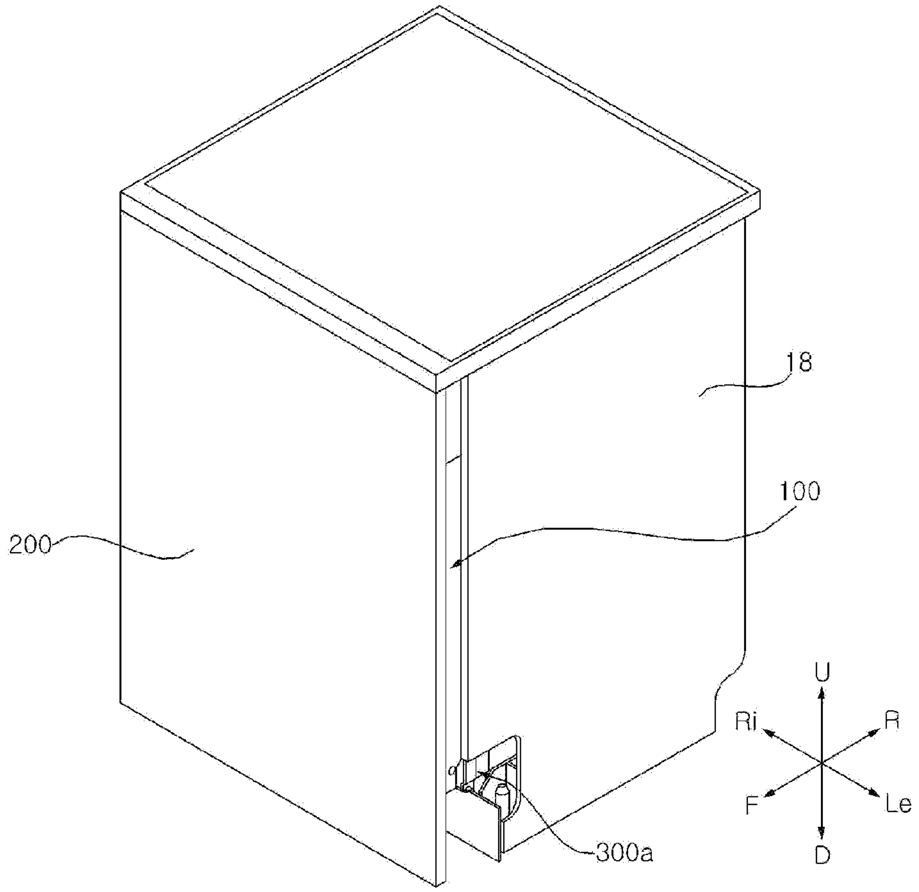
FIG. 1B is a perspective view of a dishwasher according to another embodiment of the present disclosure.
Figure 2:
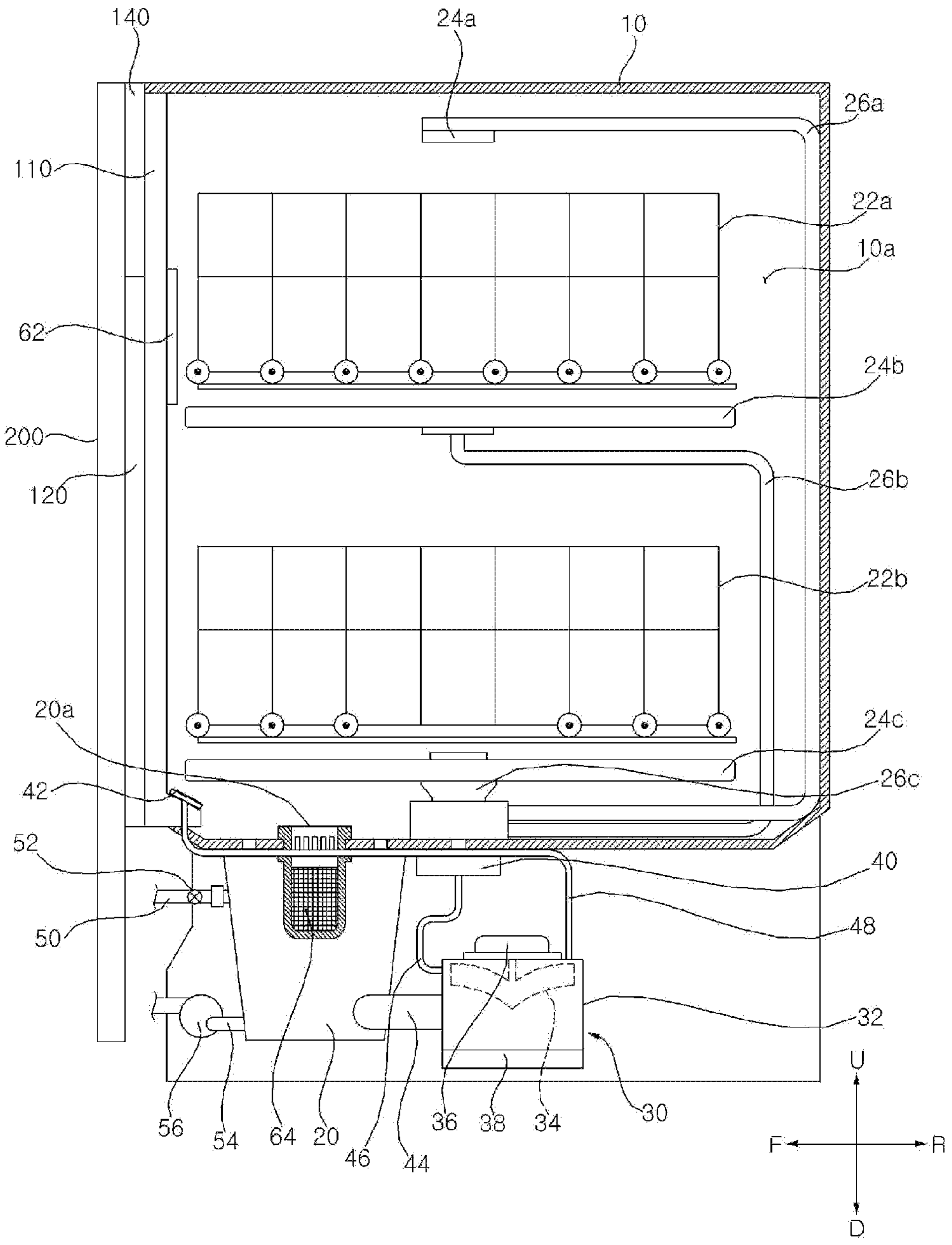
FIG. 2 is a schematic cross-sectional view of a dishwasher according to an embodiment of the present disclosure.

Referring to FIG. 1A, the dishwasher 1 may be used as a built-in dishwasher in a space such as a kitchen. Accordingly, the dishwasher 1 may not include a separate case for covering an outside of the tub 10. However, in some embodiments, as shown in FIG. 1B, a case 18 that defines an outer shape may be provided. The following description will be made based on the dishwasher according to FIG. 1A, however, the relationship among link modules 300*a* and 300*b*, the door 100, and a cover panel 200, which will be described hereinafter, may also be applied to a dishwasher including the case 18 of FIG. 1B.

The dishwasher 1 includes the tub 10 that defines a washing chamber 10*a* therein and has an open front surface, a base 70 that is disposed on a lower side of the tub 10 and allows the tub 10 to be spaced apart from a bottom or floor surface by a predetermined interval or distance, a sump 20 that is disposed on the lower side of the tub 10 and temporarily stores washing water to be supplied to the tub 10, the door 100 rotatably connected to a lower end of the tub 10 to open and close the open front surface of the tub 10, the cover panel 80 that covers the door 100 and the base 70 and is movably disposed on the door 100, and the link modules 300*a* and 300*b* configured to move the cover panel 80 in the lengthwise direction of the door when the door 100 is rotated.

The dishwasher 1 may further include a rack 22*a* and a rack 22*b* disposed in the washing chamber 10*a* and on which dishes to be washed are placed, a plurality of spray nozzles 24*a*, 24*b*, and 24*c* spraying washing water to the washing chamber 10*a*, a washing pump 30 that is disposed under the tub 10 and pumps washing water stored in the sump 20 to the plurality of spray nozzles 24*a*, 24*b*, and 24*c*, a selector valve 40 that allows washing water pumped by the washing pump 30 to be transferred to at least one of the plurality of spray nozzles 24*a*, 24*b* and 24*c*, and a plurality of connecting pipes 26*a*, 26*b*, and 26*c* through which the selector valve 40 and the respective plurality of spray nozzles 24*a*, 24*b*, and 24*c* are connected.

The washing pump 30 may rotate an impeller 34 disposed in a washing pump housing 32 by using a washing motor 36, and may supply washing water stored in the sump 20 to the tub 10. The washing pump 30 may further include a heater 38 therein that heats washing water inside the washing pump housing 32. The heater 38 may generate steam by heating washing water in the washing pump 30.

The dishwasher 1 may further include a steam nozzle 42 that delivers steam generated by the heater 38 into the tub

10. The dishwasher 1 according to this embodiment may include a washing pump inlet pipe 44 that connects the sump 20 and the washing pump 30, a washing pump discharge pipe 46 that connects the washing pump 30 and the selector valve 40, and a steam discharge pipe 48 that connects the washing pump 30 and the steam nozzle 42.

A filter 64 that filters foreign substances from washing water introduced from the tub 10 may be disposed at the sump 20. The dishwasher 1 according to this embodiment may include a water supply pipe 50 that supplies washing water to the sump 20, a water supply valve 52 that opens and closes the water supply pipe 50, a drain pipe 54 that discharges washing water of the sump 20 to the outside, and a drain pump 56.

The tub 10 may have a box shape with an open front surface. The lower side of the tub 10 may be connected to the sump 20. A sump hole 20*a* may be formed in the tub 10, and a lower side of the sump hole 20*a* may be connected to the sump 20. The plurality of racks 22*a* and 22*b* may be disposed at the washing chamber 10*a* defined in the tub 10.

The plurality of spray nozzles 24*a*, 24*b*, and 24*c* are disposed at the washing chamber 10*a* defined in the tub 10. The plurality of spray nozzles 24*a*, 24*b*, and 24*c* may spray washing water toward inner surfaces of the rack 22*a* and the rack 22*b*, or an inner surface of the tub 10.

In order to reinforce the strength of the tub 10, a tub frame 16 may be disposed on a front side of the tub 10. The tub frame 16 may be fastened to the tub 10 at an upper surface 12 and both side surfaces 14*a* and 14*b* of the tub 10.

A front lower end of the tub 10 is rotatably connected to the door 100. The tub 10 may be hingedly connected to the door 76. That is, the door 100 may rotate with respect to a door rotating shaft 100*a* disposed at the front lower end of the tub 10.

The base 70 is disposed on the lower side of the tub 10 to thereby support the tub 10. The base 70 may allow the tub 10 to be spaced apart from the floor surface by a predetermined interval, and may define a space in which the sump 20 and the washing pump 30 are disposed. The base 70 may be provided therein with a control box 60 in which a printed circuit board (not shown) that controls the operation of the washing pump 30 and the like is accommodated.

A front end 72 of the base 70 may be disposed more rearward than a front end 15 of the tub 10 in a spaced manner. The base 70 is disposed more rearward than the tub 10 so as not to interfere with movement of the cover panel 80 when the cover panel 80 moves as the door 76 is rotated.

The front end 72 of the base 70 may have a shape that is inclined rearwardly from the lower side to the upper side in consideration of the movement of the cover panel 200.

The tub 10 may be fastened to the base 70, and may be fixed to an upper side of the base 70. The tub 10 and the base 70 may be fastened to each other by a separate fastening member (not shown). Also, the tub 10 may be coupled to the base 70 through a tub bracket 80*a* and a tub bracket 80*b* described hereinafter. The tub 10 and the base 70 may be fastened to each other by the separate fastening member at the rear, and may be fastened to each other by the tub brackets 80*a* and 80*b* at the front.

<Tub Bracket>

Hereinafter, a tub bracket according to an embodiment of the present disclosure will be described with reference to FIG. 3, and FIGS. 5 to 6B.

The dishwasher 1 according to this embodiment may further include the tub bracket 80*a*, 80*b* fixedly disposed on a lower portion of the tub 10 and rotatably connected to the door 100. The tub 10 and the base 70 may be fastened to each other by the tub bracket 80*a*, 80*b*. The tub bracket 80*a*, 80*b* may fix the tub 10 to the upper side of the base 70, and may allow the door 100 to be rotatable to the front of the tub 10. The door 100 according to this embodiment may be rotatably disposed at the tub bracket 80*a*, 80*b* fastened to the tub 10. More specifically, the door bracket 160*a*, 160*b* fixed to the door 100 is rotatably disposed at the tub bracket 80*a*, 80*b* according to this embodiment.

A pair of tub brackets 80*a* and 80*b* are disposed on both side surfaces of the tub 10, respectively. The tub bracket 80*a*, 80*b* includes a first tub bracket 80*a* disposed on a left side surface of the tub 10 and a second tub bracket 80*b* disposed on a right side surface of the tub 10. The first tub bracket 80*a* and the second tub bracket 80*b*, which have a symmetrical structure, are disposed opposite each other at the tub 10. Each of the first tub bracket 80*a* and the second tub bracket 80*b* may allow the front side of the tub 10 and a front side of the base to be fastened to each other.

Figure 6A:
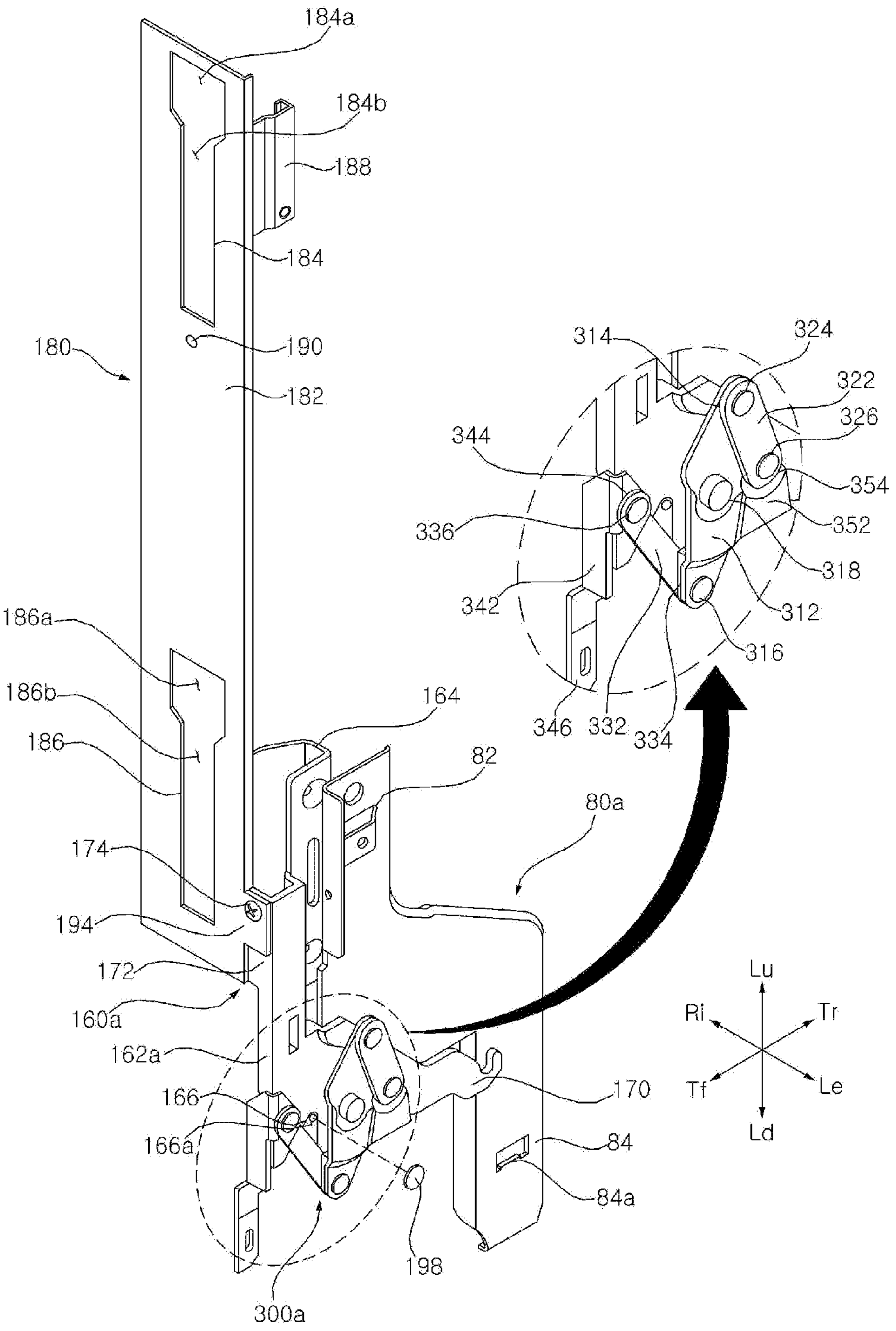
FIG. 6A is a perspective view of a tub bracket, a door bracket, and a link module, according to an embodiment of the present disclosure.
Figure 6B:
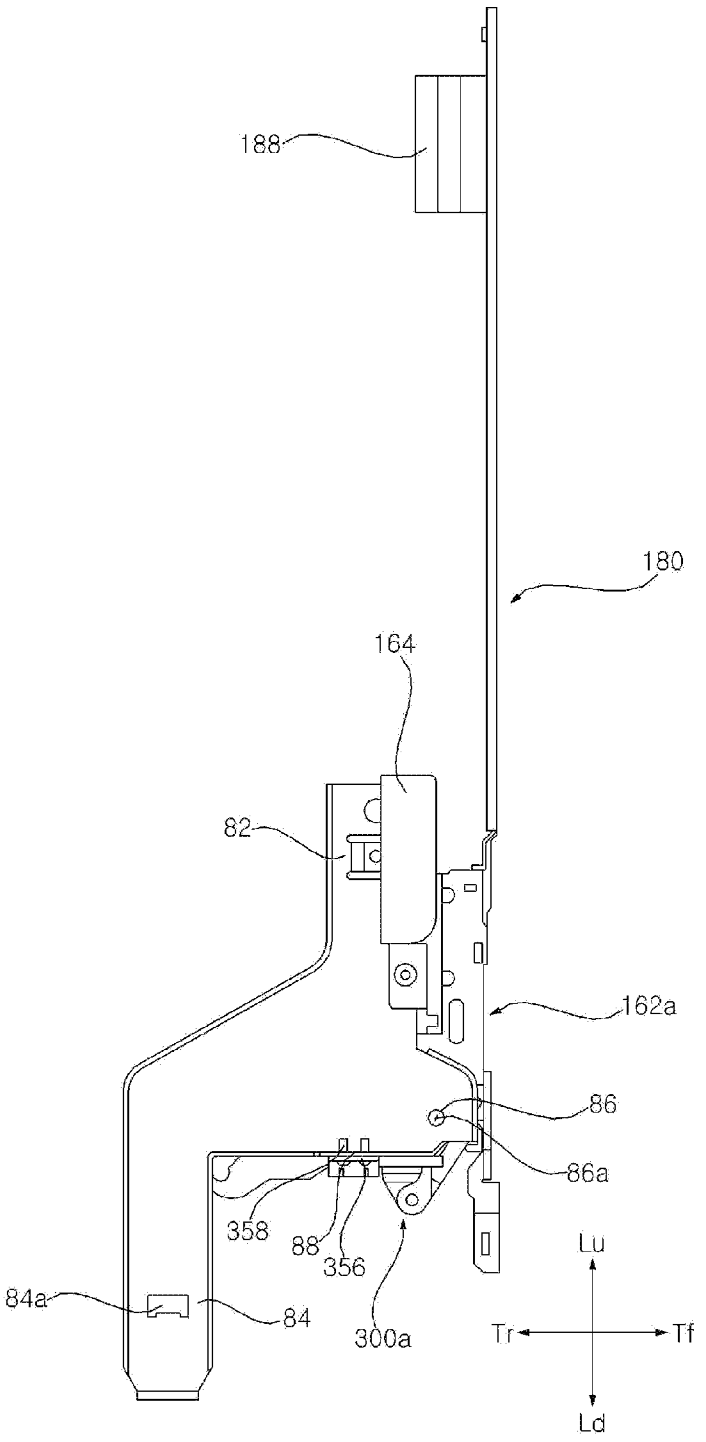
FIG. 6B is a side view of a tub bracket, a door bracket, and a link module, according to an embodiment of the present disclosure.

Hereinafter, a detailed configuration and a shape of the tub bracket 80*a*, 80*b* will be described with reference to FIGS. 6A and 6B. In FIGS. 6A and 6B, description will be made based on the first tub bracket 80*a*, however, the configuration and the shape may be equally applied to the second tub bracket 80*b*.

The tub bracket 80*a*, 80*b* may be fastened to the tub 10 and the base 70. The tub bracket 80*a*, 80*b* may include a tub fastening part 82 fastened to the tub 10, a base fastening part 84 fastened to the tub 10, and a door connecting part 86 rotatably connected to the door bracket 160*a*,160*b*.

The tub fastening part 82 is fastened to one side surface of the tub 10. The tub fastening part 82 is disposed at a front end portion of the one side surface of the tub 10. The tub fastening part 82 may be fastened to the tub 10 by a separate fastening member (not shown) such as a bolt and the like.

A hinge hole 86*a* for connection with the door bracket 160*a*, 160*b* is formed in the door connecting part 86. The door connecting part 86 and the door bracket 160*a*, 160*b* may be connected to each other through a separate hinge member (not shown). The door connecting part 86 is disposed at a lower side of the tub fastening part 82. The hinge hole 86*a* formed in the door connecting part 86 may be disposed at the front of the tub 10. Accordingly, the door rotating shaft 100*a* that allows the door 100 to rotate may be formed at the front of the tub 10.

The base fastening part 84 may extend downward from the rear of the door connecting part 86. The base fastening part 84 extends downward from a portion where the base 70 is disposed.

The base fastening part 84 may be coupled to the base 70 in a hook manner. That is, a hook portion 84*a* coupled to the base 70 is formed at the base fastening part 84 according to this embodiment. The hook portion 84*a* of the base fastening part 84 may be coupled to a corresponding structure of the base 70 in a hook manner.

The tub bracket 80*a*, 80*b* further includes a link fastening part 88 for fixing one side of the link module 300*a*, 300*b*. The link fastening part 88 may define a surface bent perpendicularly to a surface defined by the tub bracket 80*a*, 80*b*. A link bracket 350 of the link module 300*a*, 300*b* described hereinafter is fastened and fixed to the link fastening part 88. A link bracket-fastening portion 356 of the link bracket 350 is fastened to the link fastening part 88 by a fastening member 358 that is separately provided.

<Movement of Link and Door>

Hereinafter, a link module and how the link module according to an embodiment of the present disclosure works will be described with reference to FIGS. 6A to 7C.

The link module 300*a*, 300*b* allows the cover panel 200 disposed at the front of the door 100 to move in the lengthwise direction Lu-Ld of the door when the door 100 is rotated. The link module 300*a*, 300*b* uses a rotational force of the door 100 to cause the cover panel 200 to move linearly.

The like module 300*a*, 300*b* according to this embodiment may be provided in pair disposed on both side surfaces of the door, respectively. The link module 300*a*, 300*b* according to this embodiment includes a first link module 300*a* disposed on a right side of the door 100 and a second link module 300*b* disposed on a left side of the door 100. The first link module 300*a* and the second link module 300*b*, which have the same configuration and function, are disposed on the left and right sides of the door, respectively.

Hereinafter, a detailed configuration of the first link module 300*a* will be described with reference to FIGS. 6A and 6B. The configuration of the first link module 300*a* described herein may be equally applied to the second link module 300*b*.

The link module 300*a*, 300*b* according to this embodiment may include a first link 310 rotatably connected to the door bracket 160*a*, 160*b*, a second link 320 rotatably connected to the tub bracket 80*a*, 80*b* and the first link 310, and a third link 330 rotatably connected to the first link 310 and the cover panel 200. The link module 300*a*, 300*b* according to this embodiment may further include the link bracket 350 that connects the second link 320 and the tub bracket 80*a*, 80*b*, and a link holder 340 that connects the third link 330 and the cover panel 200.

The first link 310 includes a first link-1 connecting portion 314 that is disposed at one end portion of a first link body 312 and is rotatably connected to the second link 320, a first link-2 connecting portion 316 that is disposed at another end portion of the first link body 312 and is rotatably connected to the third link 330, and a first link-1 bracket connecting portion 318 that is disposed between the first link-1 connecting portion 314 and the first link-2 connecting portion 316, and is rotatably connected to the door bracket 160*a*, 160*b*.

The second link 320 includes a second link-1 connecting portion 324 that is disposed at one end portion of a second link body 322 and is rotatably connected to the first link 310, and a second link-2 connecting portion 326 that is disposed at another end portion of the second link body 322 and is rotatably connected to the tub bracket 80*a*, 80*b*. The second link-2 connecting portion 326 may be rotatably connected to the tub bracket 80*a*, 80*b* through the link bracket 350. In other words, the second link-2 connecting portion 326 is rotatably connected to a link bracket-connecting portion 354 of the link bracket 350 that is fastened to the tub bracket 80*a*, 80*b*.

The third link 330 includes a third link-1 connecting portion 334 that is disposed at one end portion of a third link body 332 and is rotatably connected to the first link 310, and a third link-2 connecting portion 336 that is disposed at another end portion of the third link body 332 and is rotatably connected to the cover panel 200. The third link-2 connecting portion 336 is rotatably connected to the cover panel 200 through the link holder 340. In other words, the third link-2 connecting portion 336 is rotatably connected to a link holder-connecting portion 344 of the link holder 340 that is fastened to the cover panel 200.

One side of the link bracket 350 is fixed to the tub bracket 80*a*, 80*b*, and another side of the link bracket 350 is rotatably connected to the second link 320. Accordingly, a position of the second link-2 connecting portion 326 of the second link 320 that is rotatably connected to the link bracket 350 is fixed.

The link bracket 350 includes a second bracket body 352, the link bracket-connecting portion 354 disposed at one end portion of the link bracket body 352 and to which the second bracket body 352 is rotatably connected, and the link bracket-fastening portion 356 disposed at another end portion of the link bracket body 352 and rotatably connected to the tub bracket 80*a*, 80*b*.

The link bracket-fastening portion 356 is fastened to one side of the tub bracket 80*a*, 80*b*, so that its placement is fixed. The link bracket-fastening portion 356 according to this embodiment is fastened to the tub bracket 80*a*, 80*b* through the fastening member 358 separately provided. As the link bracket-fastening portion 356 is fixed to the tub bracket 80*a*, 80*b*, the placement of the link bracket 350 is fixed. Accordingly, even when the door 100 is rotated, a position of the link bracket-connecting portion 354 that is rotatably connected to the second link 320 may be fixed.

The link holder 340 includes the link holder-connecting portion 344 disposed at one end portion of a link holder body 342 and to which the third link 330 is rotatably connected, and a link holder-fastening portion 346 disposed at another end portion of the link holder body 342 and fastened to the cover panel 200. The link holder 340 is connected to the cover panel 200 through a cover panel fastening member 220 that is fastened to the cover panel 200. The link holder 340 is fastened to the cover panel fastening member 220, so that its placement is fixed.

The link holder 340 may allow the cover panel 200 and the link module 300*a*, 300*b* to be fastened in a position below the tub 10. The link holder-fastening portion 346 of the link holder 340 may be disposed below a lower end of an outer door 120. When the door 100 is closed, the link holder-fastening portion 346 of the link holder 340 is disposed below the lower end of the outer door 120.

That is, as the cover panel fastening member 220 that is mounted on the cover panel 200 and the link holder-fastening portion 346 of the link holder 340 may be fastened to each other in a lower space of the tub 10, allowing a user to assemble the cover panel 200 to the link module 300*a*, 300*b*. As the link holder-fastening portion 346 is fixedly fastened to the cover panel fastening member 220, the placement of the link holder 340 in relation to the cover panel 200 may be constantly maintained.

Figure 7A:
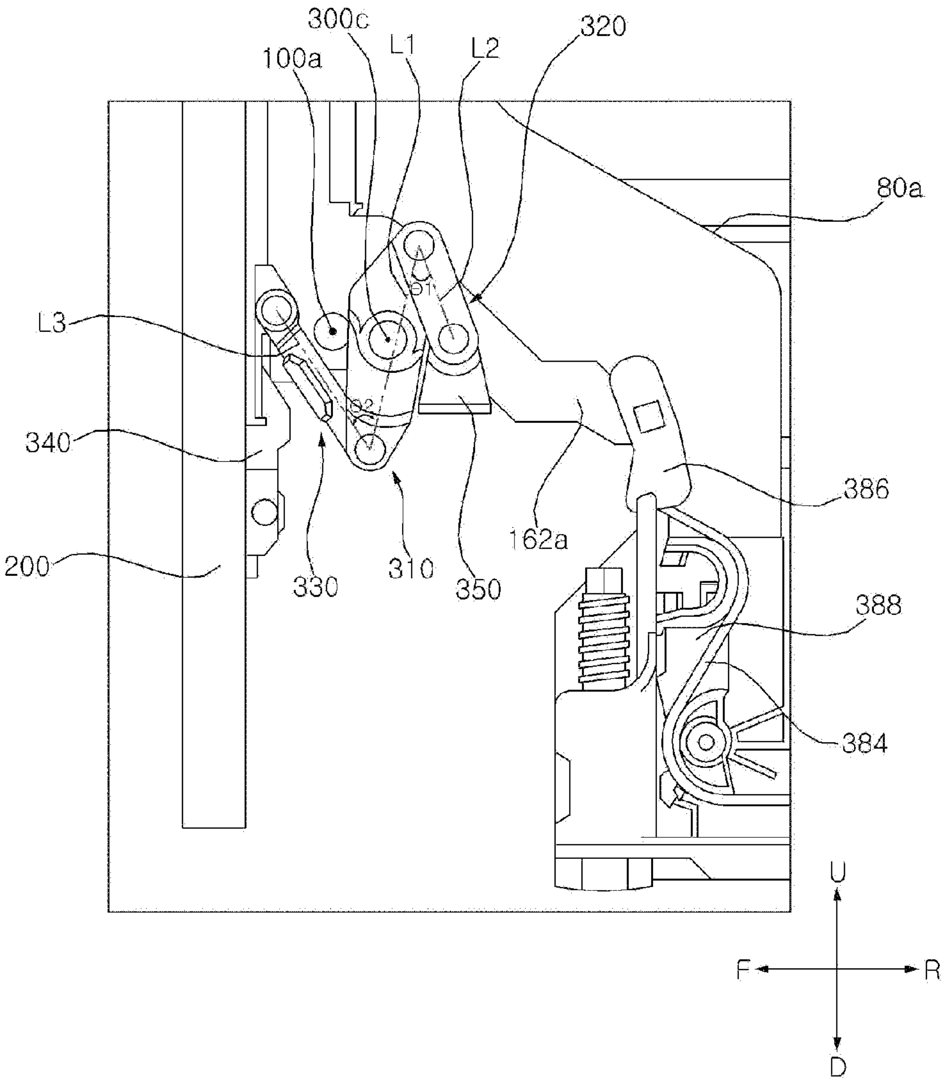
FIG. 7A is a view illustrating the arrangement of a link module with a door being closed, according to an embodiment of the present disclosure.
Figure 7B:
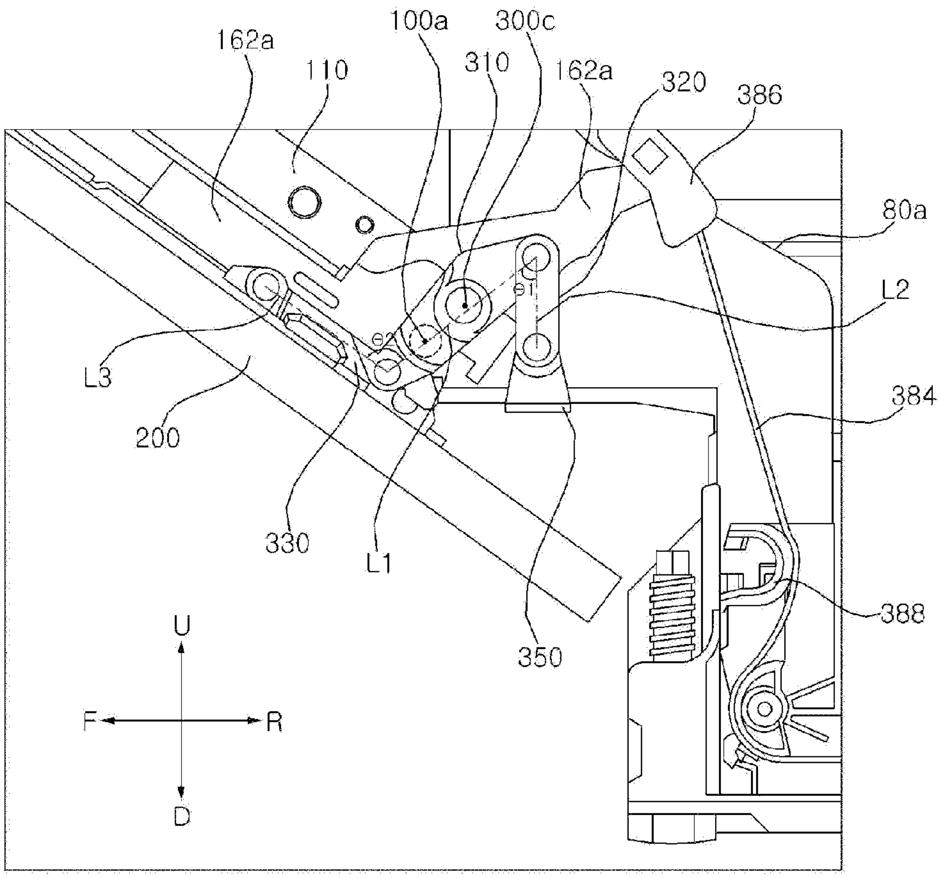
FIG. 7B is a view illustrating the arrangement of a link module with a door being open or closed, according to an embodiment of the present disclosure.
Figure 7C:
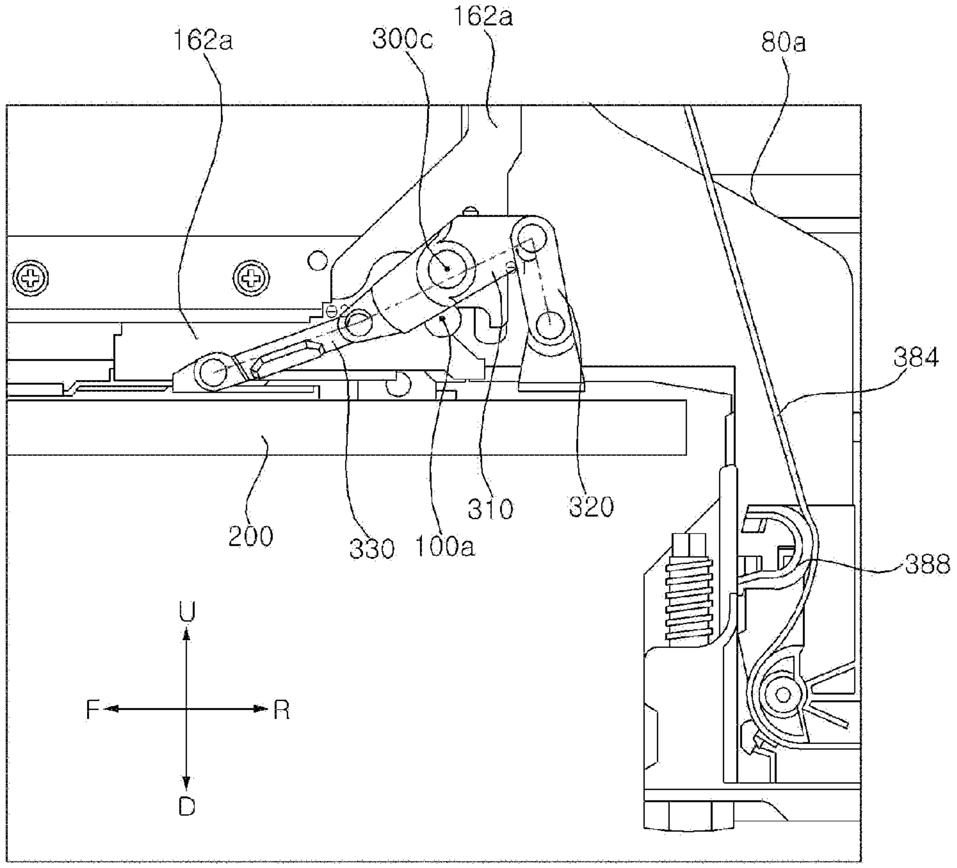
FIG. 7C is a view illustrating the arrangement of a link module with a door being fully open, according to an embodiment of the present disclosure.
Figure 8:
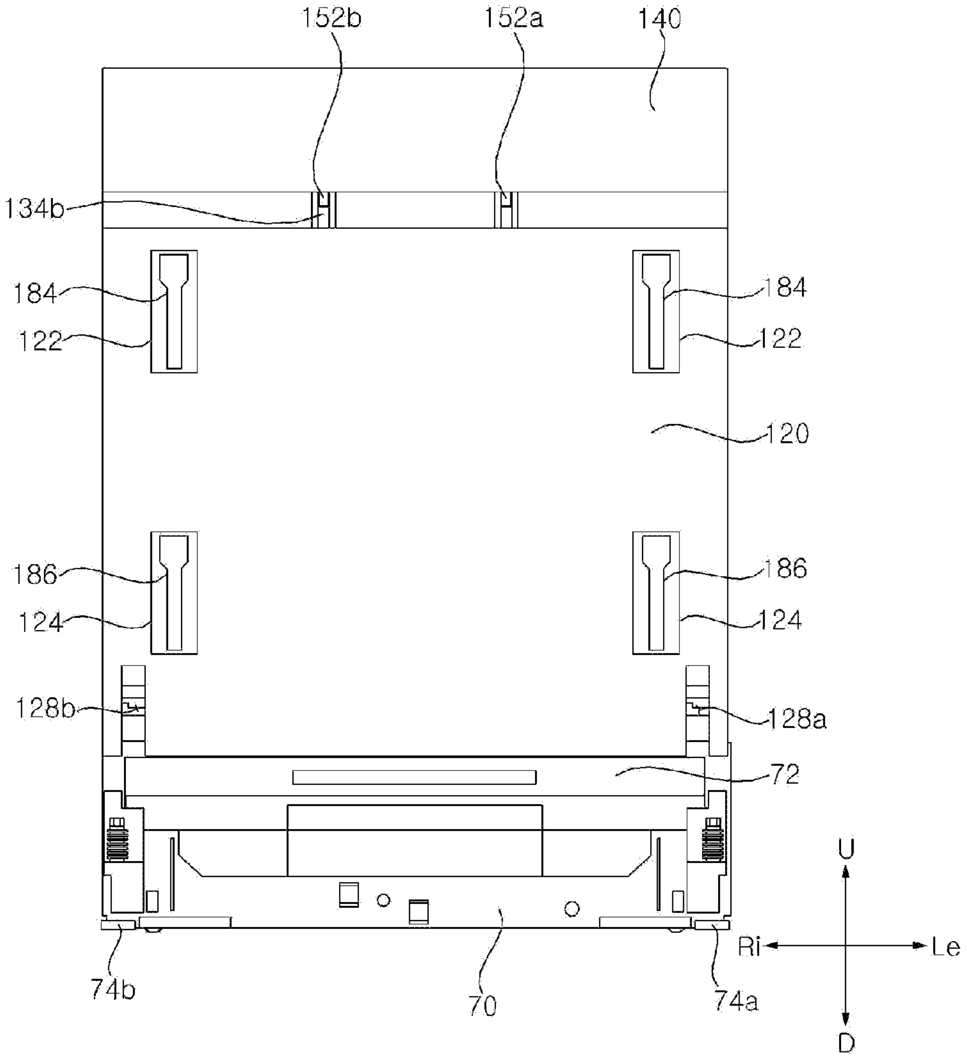
FIG. 8 is a front view of a dishwasher with the cover panel being removed, according to an embodiment of the present disclosure.
Figure 9:
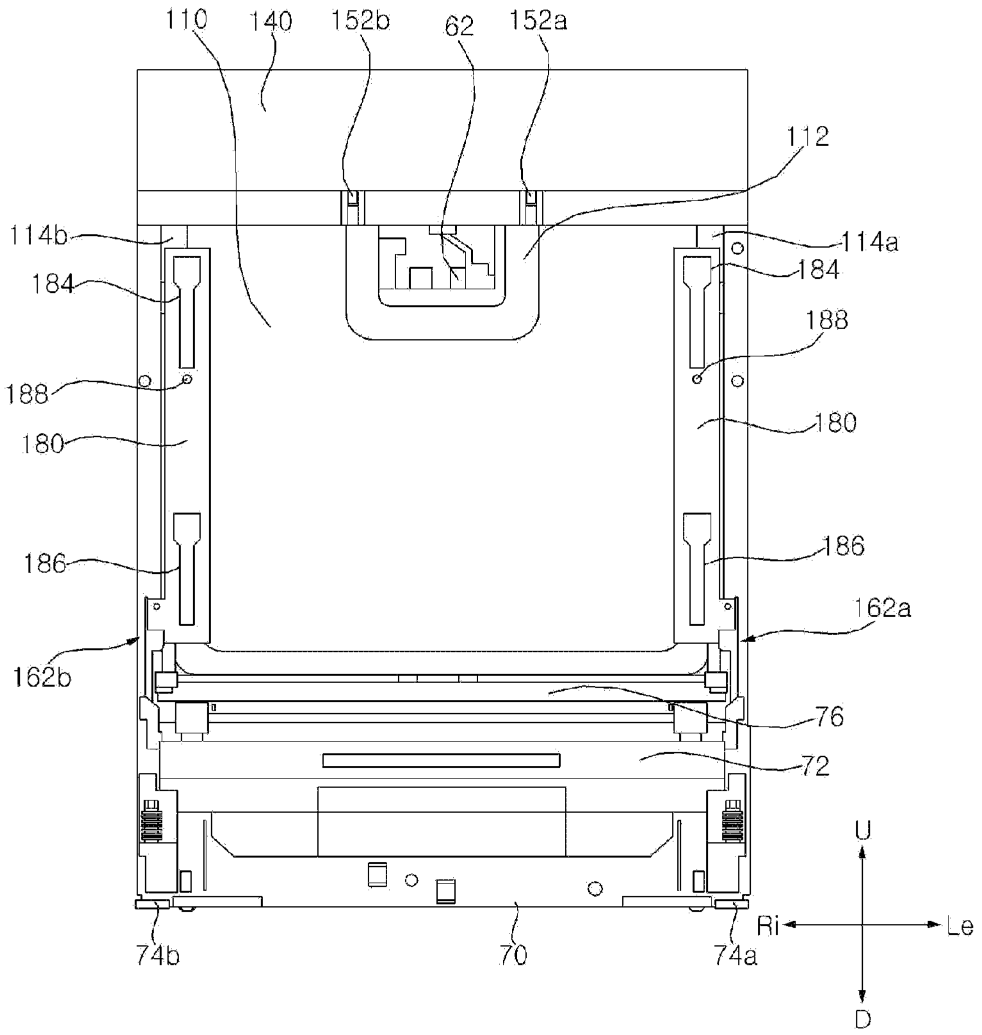
FIG. 9 is a front view illustrating a state in which an outer door of FIG. 8 is removed.
Figure 10A:
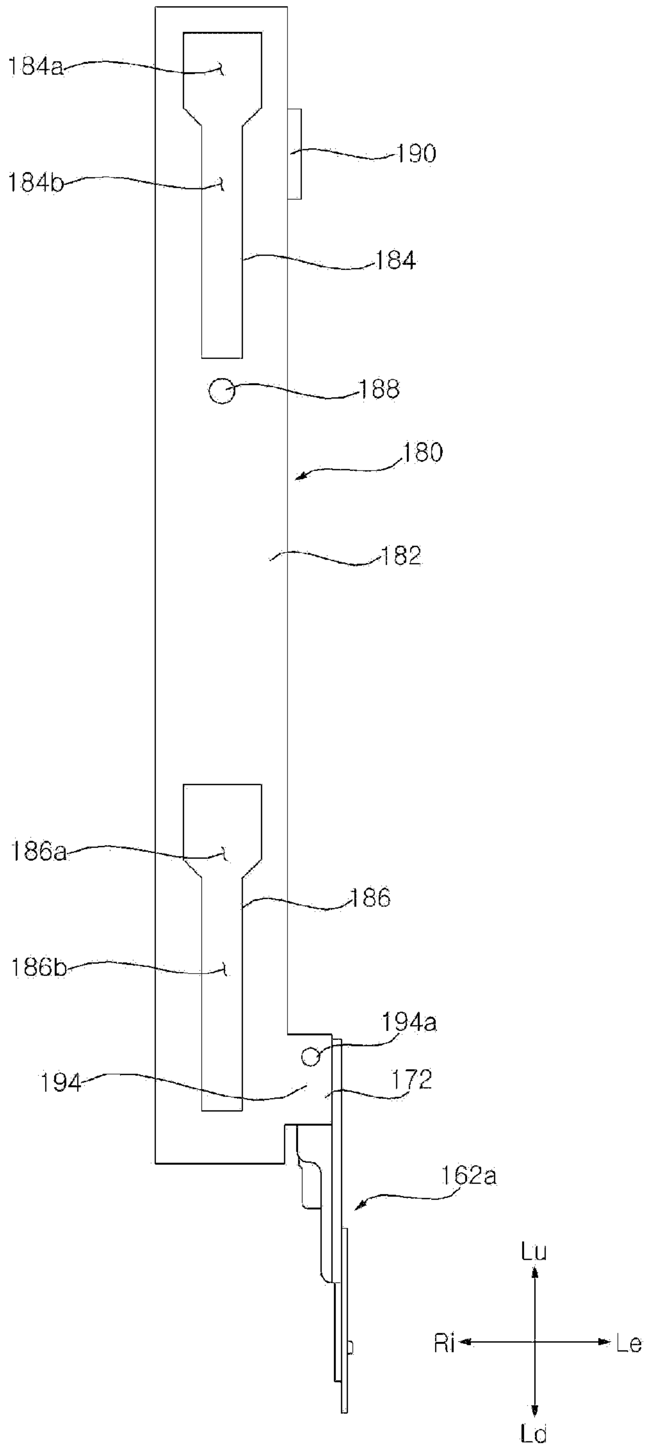
FIG. 10A is a front view of a door bracket according to an embodiment of the present disclosure.
Figure 10B:
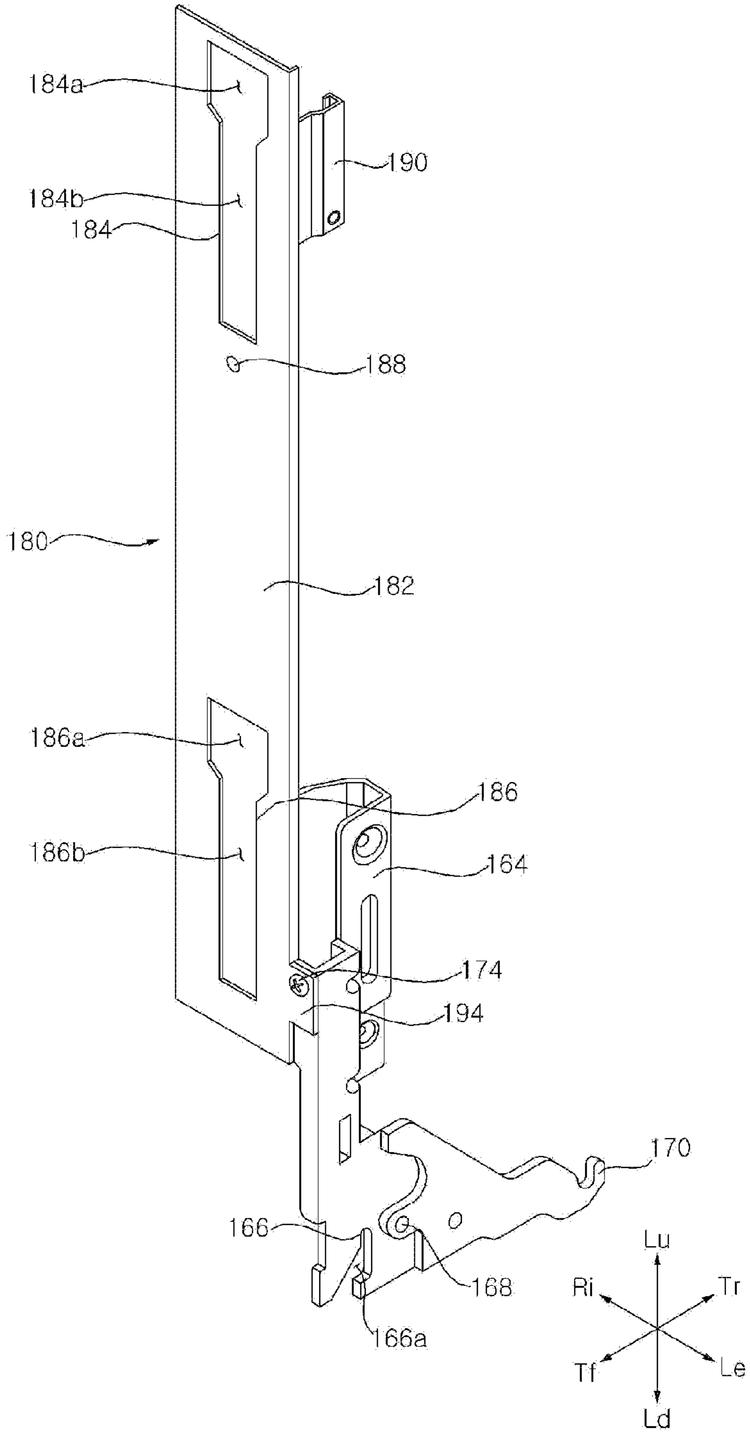
FIG. 10B is a perspective view of a door bracket according to an embodiment of the present disclosure.
Figure 11:
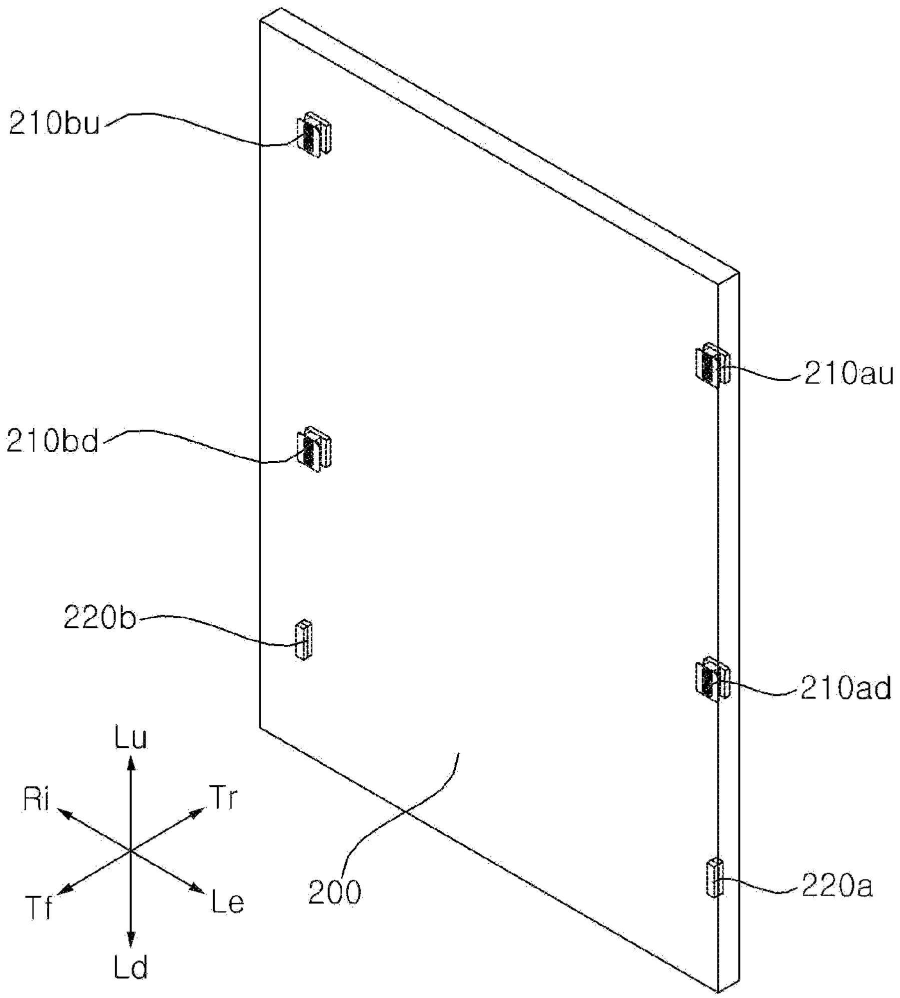
FIG. 11 is a front perspective view of a cover panel with an upper holder, a lower holder, and a cover panel fastening member being mounted thereon, according to an embodiment of the present disclosure.

Referring to FIGS. 7A to 7C, the arrangement of the link module 300*a*, 300*b* is changed according to rotation of the door 100, and the cover panel 200 that is movably disposed on the door 100 moves when the door 76 is rotated.

When the door 100 is open, a link shaft 300*c* rotates counterclockwise as the door 100 rotates with respect to the door rotating shaft 100*a*. The link shaft 300*c* moves from a rear side R of the door rotating shaft 100*a* to an upper side U of the door rotating shaft 100*a*. The link shaft 300*c* moves when the door 100 is open, allowing the first link 310 to push the third link 330 forward. Accordingly, when the door 100 is rotated, the cover panel 200 may move up in the lengthwise direction Lu of the door by the third link 330.

Conversely, when the door 100 is closed, the link shaft 300*c* rotates clockwise as the door 100 rotates with respect to the door rotating shaft 100*a*. The link shaft 300*c* moves from the upper side U of the door rotating shaft 300*c* to the rear side R of the door rotating shaft 100*a*. The link shaft 300*c* moves when the door 100 is closed, allowing the first link 310 to pull the third link 330 rearward. Accordingly, when the door 100 is rotated, the cover panel 200 may move down in the lengthwise direction Td of the door by the third link 330.

<Door and Door Bracket>

Hereinafter, a door and a door bracket mounted on the door according to an embodiment of the present disclosure will be described with reference to FIGS. 4 to 10.

The door 100 opens and closes the open front surface of the tub 10. The door 100 according to this embodiment includes an inner door 110 that is brought into contact with the front surface of the tub 10 to close the open portion of the tub 10, an outer door 120 fastened to the inner door 110 at the front of the inner door 100, and an upper cover door 140 disposed on the outer door 120 and fastened to the inner door 110.

The inner door 110 may be disposed at the open front portion of the tub 10 to close the tub 10. The upper cover door 140 and the outer door 120 are mounted on the front of the inner door 100. The inner door 110 may have a substantially rectangular plate shape. A dispenser 62 that temporarily stores detergent and the like supplied into the tub 10 may be disposed at the inner door 110. The inner door 110 includes a dispenser mounting portion 112 to which the dispenser 62 is mounted. The dispenser 62 is disposed to be open in an inner direction of the inner door 110.

The inner door 110 is provided with a door bracket fastening groove 114*a*, 114*b* in which a portion of a first door bracket 162 described hereinafter is accommodated. The door bracket fastening groove 114*a*, 114*b* is elongated in the up-and-down direction. An inner door fastening portion 190 described hereinafter is inserted into the door bracket fastening groove 114*a*, 114*b*.

The door bracket fastening groove 114*a*, 114*b* defines a groove recessed rearward from a front surface of the inner door 110 on which the first door bracket 162 is mounted. The first door bracket 162 may be inserted into the door bracket fastening groove 114*a*, 114*b*, and may be fixed to the inner door 110 through a separate fastening member (not shown).

A pair of door bracket fastening grooves 114*a* and 114*b* to which a pair of first door brackets 162 is mounted is formed in the inner door 110. The pair of door bracket fastening grooves 114*a* and 114*b* may be respectively formed on both end portions of the front surface of the inner door 110.

The outer door 120 and the upper cover door 140 are fastened to the front surface of the inner door 110. The outer door 120 and the upper cover door 140 are vertically disposed on the front surface of the inner door 110.

The outer door 120 is disposed at the front of the inner door 110. The outer door 120 may be disposed under the upper cover door 140. The inner door 110 is disposed at the rear of the outer door 120, and the cover panel 200 is disposed at the front of the outer door 120.

The outer door 120 includes a front plate 120*a* and an edge portion 120*b* bent at an edge or periphery of the front plate 120*a*. The front plate 120*a* has a rectangular plate shape, and is provided with a pair of upper holes 122 and a pair of lower holes 124 at the front of a second door bracket 180. The edge portion 120*b* may be bent at both edges of the front plate 120*a* in a direction toward the inner door 110. The edge portion 120*b* and the inner door 110 may be fastened to each other by a separate fastening member (not shown).

The cover panel 200 is mounted on the outer door 120 to be movable in the lengthwise direction of the door. A portion of an upper end of the outer door 120 may be fastened to a lower portion of the upper cover door 140. The outer door 120 includes upper fastening portions 134*a* and 134*b* disposed at an upper end portion of the outer door 120 and connected to a lower end portion of the upper cover door 140. The upper fastening portions 134*a* and 134*b* are fastened to lower fastening portions 152*a* and 152*b* of the upper cover door 140, respectively. The upper fastening portion 134*a*, 134*b* and the lower fastening portion 152*a*, 152*b* may be fastened to each other in a hook manner.

The outer door 120 is provided with the pair of upper holes 122 and the pair of lower holes 124 that are open in a movement range of the cover panel 200. The upper hole 122 is disposed at the front of an upper guide unit or an upper guide 184 of the second door bracket 180 described hereinafter. The lower hole 124 is disposed at the front of a lower guide unit or a lower guide of the second door bracket 180 to be described hereinafter.

A size of the upper hole 122 is greater than a combined size of an upper insertion hole 184*a* and an upper guide hole 184*b* formed in the upper guide 184 of the second door bracket 180. A size of the lower hole 124 is greater than a combined size of a lower insertion hole 186*a* and a lower guide hole 186*b* formed in the lower guide part 186 of the second door bracket 180. The upper hole 122 and the lower hole 124 may have a rectangular shape. The pair of upper holes 122 is disposed above the pair of lower holes 124, respectively.

The second door bracket 180 may be disposed at the rear of the outer door 120 in which the upper hole 122 and the lower hole 124 are formed.

The second door bracket 180 is disposed on one side of the outer door 120. The second door bracket 180 is disposed on a rear surface of the outer door 120.

The outer door 120 is provided with a fastening groove 132*a*, 132*b* fastened to the second door bracket 180 by a separate fastening member (not shown). The fastening groove 132*a*, 132*b* may be formed between the upper hole 122 and the lower hole 124. The upper hole 122 and the lower hole 124 are formed in the lengthwise direction Lu-Ld of the door.

The hole formed in the upper guide 184 of the second door bracket 180 and the hole formed in the lower guide 186 of the second door bracket 180 may be smaller in size than the upper hole 122 and the lower hole 124 formed in the outer door 120.

The outer door 120 is provided with a fastening member moving groove 128*a*, 128*b* in which the cover panel fastening member 220 moves in the lengthwise direction Lu-Ld of the door. The fastening member moving groove 128*a*, 128*b* has a guide structure in which the cover panel fastening member 220 moves. The fastening member moving grooves 128*a*, 128*b* is formed upward from the lower end of the outer door 120 in the lengthwise direction Lu of the door. The cover panel fastening member 220 may move along the fastening member moving groove 128*a*, 128*b*, and may allow the cover panel 200 to move in the lengthwise direction Lu-Ld of the door.

The upper cover door 140 is fastened to the front surface of the inner door 110. The upper cover door 140 is disposed on the outer door 120. An operation button (not shown) that allows a user to manipulate the dishwasher 1 may be disposed on one side surface of the upper cover door 140, and a printed circuit board (not shown) that is connected to the manipulation button may be disposed in the upper cover door 140.

Figure 5:
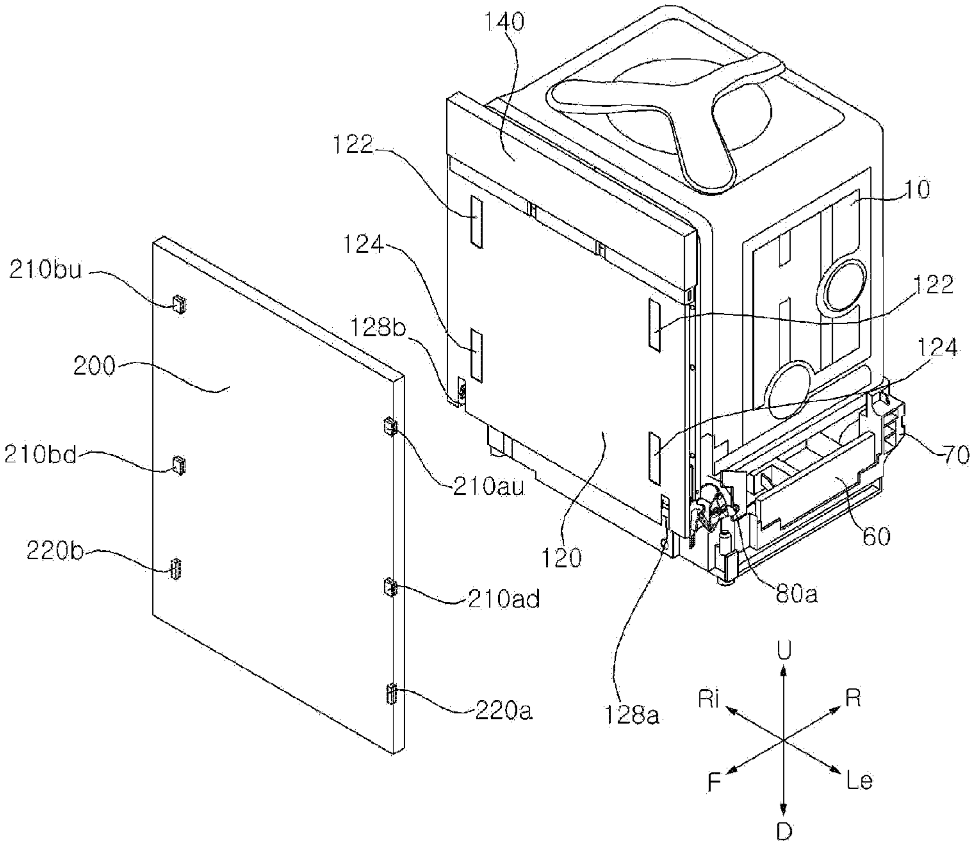
FIG. 5 is a disassembled perspective view of a dishwasher and a cover panel, according to an embodiment of the present disclosure.

The cover panel 200 is disposed at the front of the upper cover door 140 to be movable in the lengthwise direction Lu-Ld of the door. Referring to FIG. 5, the cover panel 200 is not mounted on the upper cover door 140.

The lower fastening portions 152*a* and 152*b* fastened to the outer door 120 that is disposed under the upper cover door 140 may be disposed at the lower portion of the upper cover door 140.

The dishwasher 1 further includes the door bracket 160*a*, 160*b* fixedly fastened to the door and rotatably connected to the tub 10.

The door bracket 160*a*, 160*b* is fixedly connected to the door 100 and rotatably connected to the tub bracket 80*a*, 80*b* fixedly connected to the tub 10. The door bracket 160*a*, 160*b* may move the door 100 such that the door 100 opens and closes the open front surface of the tub 10. A portion of the door bracket 160*a*, 160*b* is disposed between the inner door 110 and the outer door 120.

The door bracket 160*a*, 160*b* includes the first door bracket 162 that is fastened to the inner door 110 and is rotatably connected to the tub 10, and the second bracket 180 that is connected to the first door bracket 162 and is fastened to the outer door 120.

The first door bracket 162 includes a door fastening portion 164 fastened to the door 100, a tub connecting portion 166 rotatably connected to the tub 10, and a link connecting portion 168 connected to the first link 310. The first door bracket 162 according to this embodiment may further include a door fixing part-connecting portion 170 connected to a door fixing part 380 that allows the partially open door 100 to maintain its placement or position.

A cross section of the door fastening portion 164 has a '⊏' shape when viewed from above, and extends in the lengthwise direction of the door. The door fastening portion 164 has a shape corresponding to the door bracket fastening groove 114*a*, 114*b* of the inner door 110. Accordingly, the door fastening portion 164 may be inserted into the door bracket fastening groove 114*a*, 114*b* of the inner door 110 to be fastened with a separate fastening member (not shown).

The tub connecting portion 166 is disposed at a lower side of the door fastening portion 164. The tub connecting portion 166 is disposed at an outside of a side surface of the tub 10. The tub connecting portion 166 is disposed at an outside of the tub bracket 80*a*, 80*b* disposed on the side surface of the tub 10. The tub connecting portion 166 is rotatably connected to the tub bracket 80*a*, 80*b* fastened to the tub 10. The tub connecting portion 166 and the tub bracket 80*a*, 80*b* may be rotatably connected through a separate hinge member (not shown). Accordingly, a hinge hole 166*a* into which a hinge member (not shown) is inserted may be formed in the tub connecting portion 166. The hinge hole 166*a* may extend downward of the first door bracket 162. The hinge hole 166*a* may extend upward from a front lower end portion of the first door bracket 162. Accordingly, the first door bracket 162 may be connected by fitting the hinge hole 166*a* into the tub bracket 80*a*, 80*b* to which a hinge is connected. An upper side of the hinge hole 166*a* may have a size of a thickness of the hinge mounted on the tub bracket 80*a*, 80*b*, allowing the first door bracket 162 to rotate stably.

As the tub connecting portion 166 is disposed on the door rotating shaft 100*a* that allows the door 100 to rotate, its position is fixed even though the placement of the door 100 is changed due to the opening or closing of the door 100.

The link connecting portion 168 may be disposed on one side of the tub connecting portion 166. When the door 100 is rotated, the link connecting portion 168 may rotate clockwise or counterclockwise with respect to the tub connecting portion 166. The link connecting portion 168 according to this embodiment may be disposed at the rear Tr in the thickness direction Tf-Tr of the door, with respect to the tub connecting portion 166. The first link 310 of the link module 300*a*, 300*b* is rotatably connected to the link connecting portion 168. The link connecting portion 168 is rotatably connected to the first link-bracket connecting portion 318 of the first link 310. The link connecting portion 168 and the first link 310 may be connected to each other through a hinge member and a separate fastening member.

When the door 100 is rotated, the first link-bracket connecting portion 318 of the first link 310 moves along the link connecting portion 168.

The door fixing part-connecting portion 170 is disposed at the rear Tr in the thickness direction Tf-Tr of the door, with respect to the tub connecting portion 166. The door fixing part-connecting portion 170 extends rearward Tr from the door 100 in the thickness direction Tf-Tr of the door, and an end of the fixing part-connecting portion 170 is connected to a connection clip 386 of the door fixing part 380.

As the end of the door fixing part-connecting portion 170 according to this embodiment has a hook shape, and the connection clip 386 is fastened to the door fixing part-connecting portion 170 formed in the hook shape, the first door bracket 162 and the door fixing part 380 may be connected to each other.

With respect to the tub connecting portion 166, the door fastening portion 164 extends upward Lu in the lengthwise direction Lu-Ld of the door and is fastened to the door 100. With respect to the tub connecting portion 166, the door fixing part-connecting portion 170 extends rearward Tr in the thickness direction Tf-Tr of the door, and the end thereof is connected to the door fixing part 380.

The first door bracket 162 includes a first bracket fastening portion 172 fastened to the second door bracket 180. The first bracket fastening portion 172 and a second bracket fastening portion 194 of the second door bracket 180 that is fastened to the outer door 120 may be connected to each other through a fastening member 174. The first bracket fastening portion 172 may be disposed at the front Tf of the door fastening portion 164 in the thickness direction Tf-Tr of the door.

The first door bracket 162 is disposed between the tub bracket 80*a*, 80*b* and the link module 300*a*, 300*b*.

The second door bracket 180 is disposed between the inner door 110 and the outer door 120. The second door bracket 180 is fastened to the outer door 120 at the rear of the outer door 120 in the thickness direction Tf-Tr of the door. One side of the second door bracket 180 is fastened and fixed to the first door bracket 162, and another side of the second door bracket 180 is fastened and fixed to the outer door 120.

As the second door bracket 180 is vertically disposed at the first door bracket 162 in the lengthwise direction Lu-Ld of the door, a load generated by the cover panel 200 may be distributed to the first door bracket 162. The second door bracket 180 has a substantially rectangular plate shape.

Referring to FIGS. 6A and 6B, the second door bracket 180, the upper guide 184 that guides the movement of an upper holder 210*au*, 210*bu*, and the lower guide 186 that guides the movement of a lower holder 210*ad*, 210*bd*.

The upper guide 184 is provided with the upper insertion hole 184*a* into which the upper holder 210*au*, 210*bu* is inserted, and the upper guide hole 184*b* that extends downward of the upper insertion hole 184*a* and guides the movement of the upper holder 210*au*, 210*bu*. The upper insertion hole 184*a* has a size enough for the entire upper holder 210*au*, 210*bu* to pass therethrough. A lower end of the upper insertion hole 184*a* is connected to the upper guide hole 184*b*, and a portion of upper insertion hole 184*a* that leads to the upper guide hole 184*b* is reduced in size. A guide groove 214 of the upper holder 210*au*, 210*bu* is inserted into both sides of the upper guide hole 184*b*.

The lower guide 186 is provided with the lower insertion hole 186*a* into which the lower holder 210*ad*, 210*bd* is inserted, and the lower insertion hole 186*b* that extends downward and guides the movement of the lower holder 210*ad*, 210*bd*. The lower insertion hole 186*a* and the upper insertion hole 184*a* may have the same shape, and the lower guide hole 186*b* and the upper guide hole 184*b* may have the same shape. The upper guide 184 and the lower guide 186 may have the same size. The upper guide 184 and the lower guide 186 are spaced apart from each other by a vertical length of the upper guide 184 or the lower guide 186 or more. The upper guide 184 and the lower guide 186 may be spaced apart from each other by an interval or distance greater than or equal to a vertical length of the upper insertion hole 184*a* and the upper guide hole 184*b* defined by the upper guide 184.

The second door bracket 180 includes a bracket front surface 182 on which the upper guide 184 and the lower guide 186 are disposed, the second bracket fastening portion 194 connected to the first door bracket 162 at a lower portion of the bracket front surface 182, and the inner door fastening portion 190 fastened to the inner door 110 at an upper portion of the bracket front surface 182.

The upper guide 184 and the lower guide 186 are disposed on the bracket front surface 182. An outer door fastening portion 188 that is fastened to the outer door 120 between the upper guide 184 and the lower guide 186 is disposed at the bracket front surface 182. The outer door fastening portion 188 may be fastened to the outer door 120 through a separate fastening member (not shown).

The second door bracket 180 may be fastened to the outer door 120 at a portion between the upper guide 184 and the lower guide 186. An upper end of the second door bracket 180 may be fastened to the inner door 110, and a lower end of the second door bracket 180 may be fastened to the inner door 110 through the first door bracket 162. In other words, the second door bracket 180 may allow a load of the cover panel 200 generated in the upper guide 184 and the lower guide 186 to be distributed to the outer door 120 and the inner door 110.

The second bracket fastening portion 194 is formed on one side of the bracket front surface 182 on which the lower guide 186 is formed in a direction of the first door bracket 162. The inner door fastening portion 190 extends by being bent rearward in the door thickness direction Tf-Tr at one side of the bracket front surface 182 where the upper guide 184 is formed, and is fastened to the inner door 110. The inner door fastening portion 190 may be inserted into the door bracket fastening groove 114*a*, 114*b* to be fastened to the inner door 110. The second bracket fastening portion 194 is disposed on a lower side of the bracket front surface 182 and is fastened to the first door bracket 162. A fastening hole 194*a*, which is fastened to the first door bracket 162 with a separate fastening member (not shown), is formed in the second bracket fastening portion 194.

The inner door fastening portion 190 is disposed at an upper portion of the second door bracket 180. The inner door fastening portion 190 may extend by being bent rearward in the thickness direction Tf-Tr of the door, and may be inserted into the door bracket fastening groove 114*a*, 114*b* of the inner door 110. The inner door fastening portion 190 may be fastened to the inner door 110 through a separate fastening member (not shown). As the second door bracket 180 is fastened to the outer door 120 and the inner door 110, a load generated by the cover panel 200 may be distributed.

<Door Fixing Part>

Figure 3:
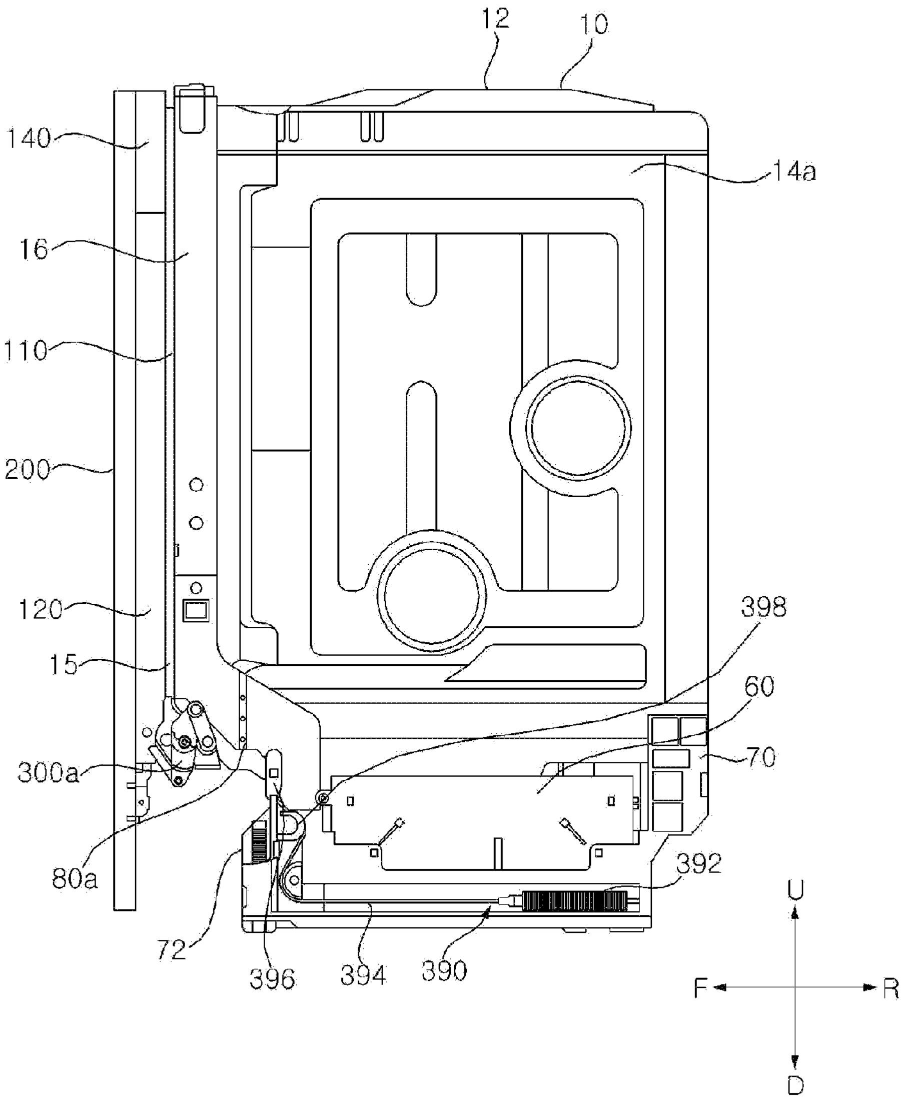
FIG. 3 is a side view of a dishwasher according to an embodiment of the present disclosure.
Figure 4:
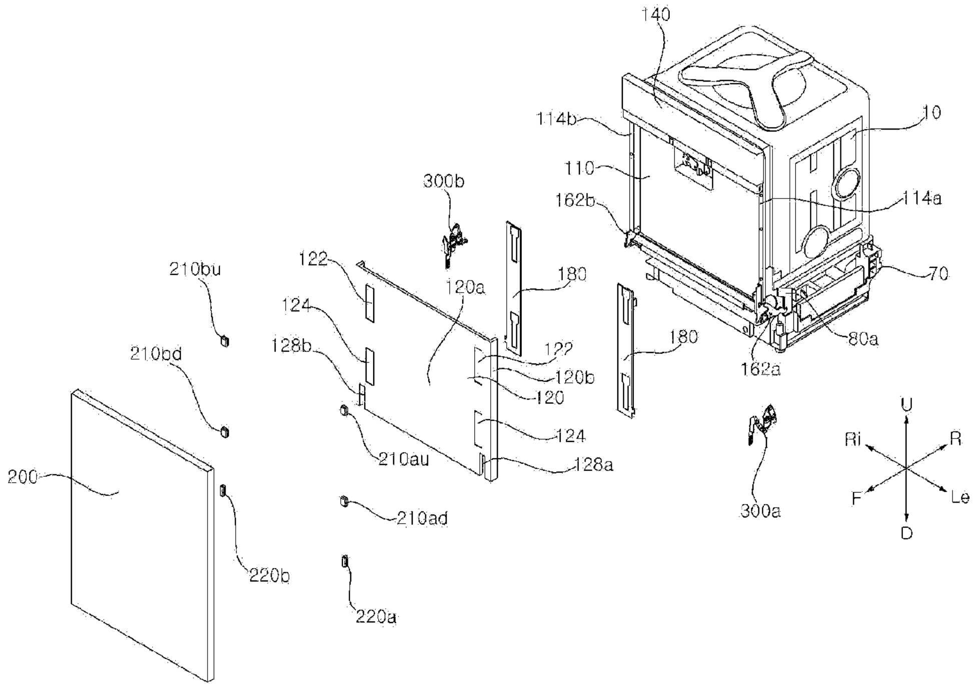
FIG. 4 is an exploded view of a door-related configuration of a dishwasher according to an embodiment of the present disclosure.

Hereinafter, a door fixing part according to an embodiment of the present disclosure will be described with reference to FIG. 3.

The dishwasher according to this embodiment includes the door fixing part 380 for maintaining the placement of the door 100 that is open from the tub 10.

The door fixing part 380 according to this embodiment may allow the placement of the door 100 to be maintained. The door fixing part 380 is connected to the door bracket 160*a*, 160*b* to apply an elastic force to the door 100 in a direction opposite to a direction in which the door 100 is open.

The door fixing part 380 includes an elastic member 382 that applies an elastic force to the door 100 in the rear direction, a connecting member 384 that connects the elastic member 382 and one side of the door 100, and the connection clip 386 that is disposed at an end of the connecting member 384 and is fastened to the door fixing part-connecting portion 170 of the door bracket 160*a*, 160*b*.

The door fixing part 380 may further include a friction member 388 that applies a frictional force to the connecting member 384. The friction member 388 applies friction in a direction perpendicular or inclined to a direction in which the connecting member 384 extends, thereby expanding a range of parallel forces generated between the door 100 on which the elastic member 382 and the cover panel 200 are mounted. This may allow the door 100 on which the cover panel 200 with a specific weight is mounted to maintain the state of being open from the tub 10 at a specific angle.

The door fixing part 380 is connected to the door fixing part-connecting portion 170 of the first door bracket 162 that is fixed to the door 100. The first door bracket 162 is fixedly disposed on the door 100, and the door fixing part-connecting portion 170 is disposed at the rear Td of the door 100 in the door thickness direction Tf-Td. The door fixing part 380 that is connected to the first door bracket 162 applies a force to the door fixing part-connecting portion 170 formed at a rear end of the first door bracket 162 in the down D or bottom rear R direction.

<Cover Panel>

Hereinafter, a cover panel according to an embodiment of the present disclosure will be described with reference to FIGS. 4 and 5, and FIGS. 11 to 14.

The cover panel 200 is disposed at the front of the door 100 to be movable in the lengthwise direction Lu-Ld of the door. The cover panel 200 according to this embodiment moves up and down in the lengthwise direction Lu-Ld of the door when the door 100 is rotated. The cover panel 200 may have a rectangular plate shape, and may cover the front surfaces of the door 100 and the base 70.

The cover panel fastening member 220 that is mounted on one side of the link module 300*a*, 300*b* to move the cover panel 200, and the holder 210*au*, 210*bu*, 210*ad*, 210*bd* that is mounted on the door 100 to guide the movement of the cover panel 200 are fastened to the cover panel 200. A plurality of holders 210*au*, 210*bu*, 210*ad* and 210*bd*, and a plurality of cover panel fastening members 220 may be fastened to a rear surface of the cover panel 200. The plurality of holders 210*au*, 210*bu*, 210*ad* and 210*bd*, and the plurality of cover panel fastening members 220*a* and 220*b* are fastened to the rear surface of the cover panel 200.

The holder 210*au*, 210*bu*, 210*ad*, 210*bd* may include an upper holder 210*au*, 210*bu* that moves along the upper guide hole 184*b* of the second door bracket 180, and an outer door lower holder 210*ad*, 210*bd* that moves along the lower guide hole 186*b* of the second door bracket 180. The upper holder (210*au*, 210*bu*) and the lower holder (210*ad*, 210*bd*) are each provided in pair, so as to be mounted on a pair of second door brackets 180, respectively.

The pair of upper holders 210*au* and 210*bu*, and the pair of lower holders 210*ad* and 210*bd* have the same shape. In this embodiment, the pair of upper holders 210*au* and 210*bu*, and the pair of lower holders 210*ad* and 210*bd* may be classified or divided according to positions of being fastened to the cover panel 200.

Figure 12A:
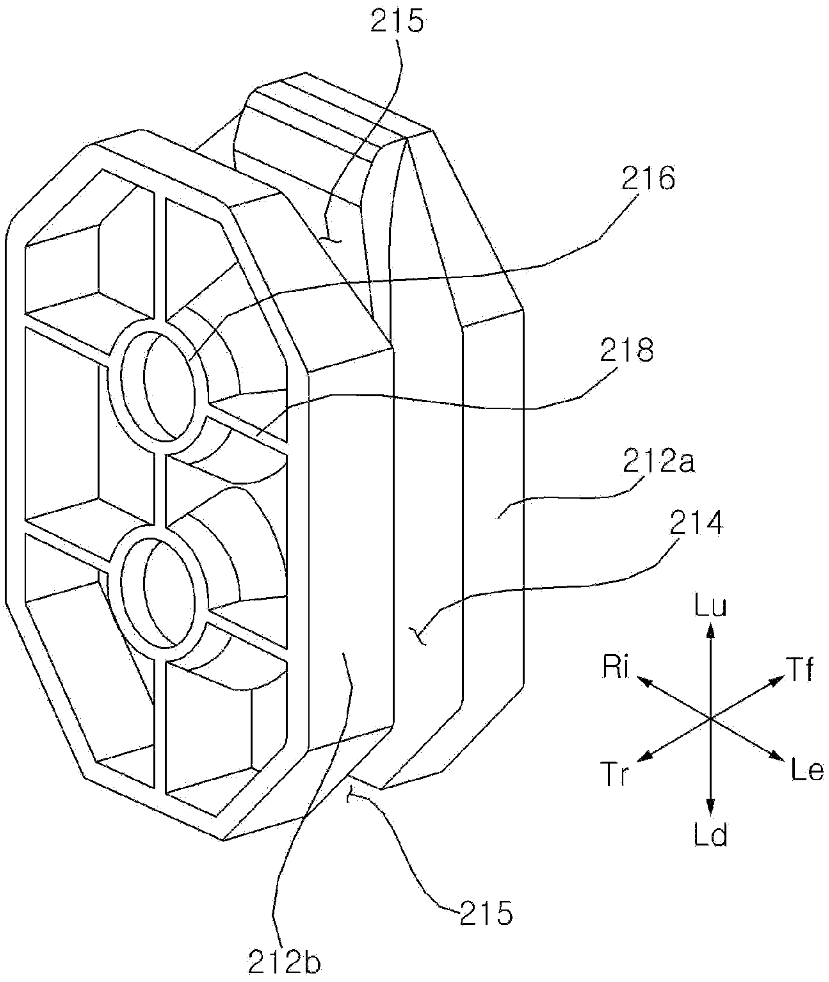
FIG. 12A is a perspective view of an upper holder and a lower holder, according to an embodiment of the present disclosure.
Figure 12B:
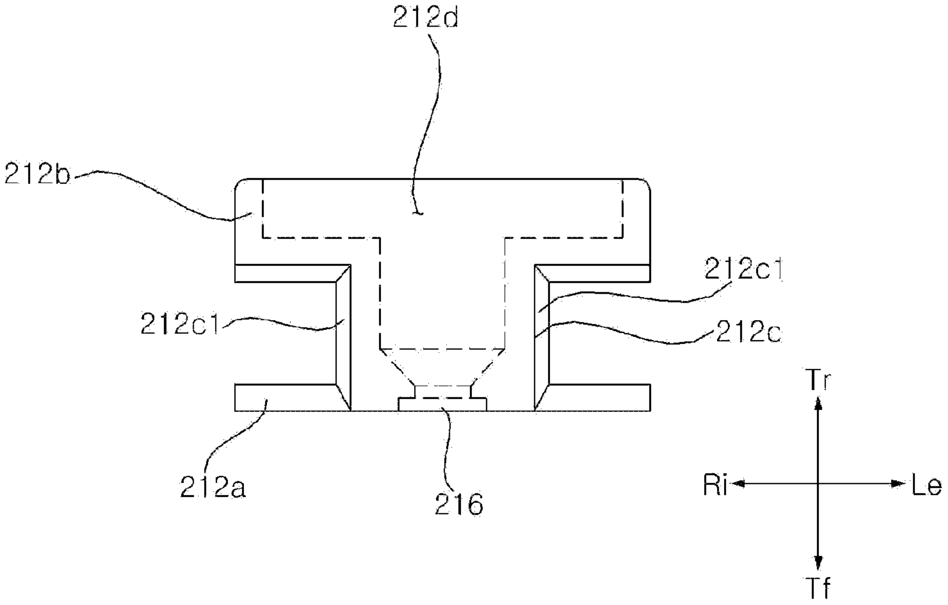
FIG. 12B is a plan view of an upper holder and a lower holder, according to an embodiment of the present disclosure.
Figure 13:
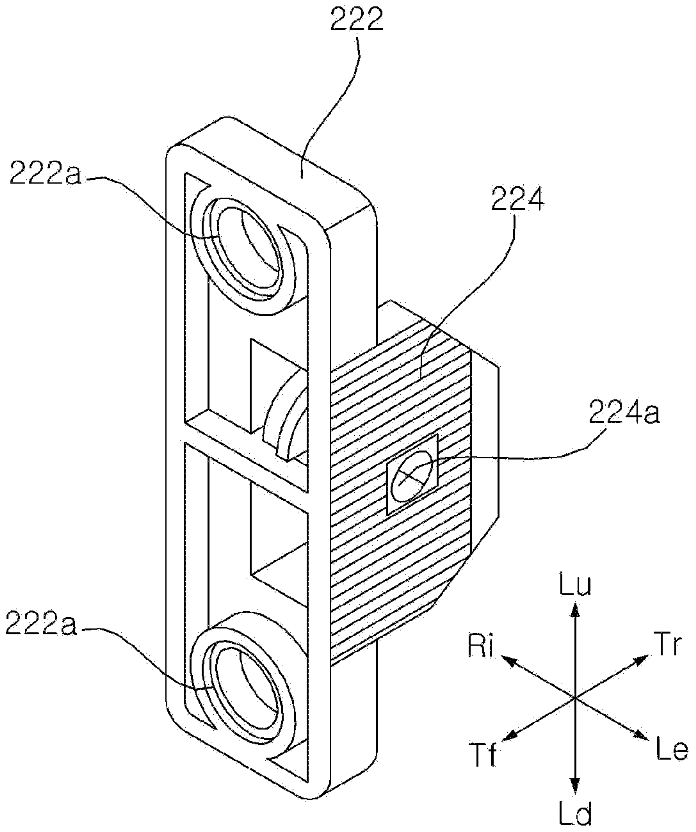
FIG. 13 is a perspective view of a cover panel fastening member according to an embodiment of the present disclosure.

Referring to FIGS. 12A and 12B, the holder 210*au*, 210*bu*, 210*ad*, 210*bd* is configured as a holder body 212 defining the guide groove 214 on both sides thereof. The holder body 212 includes a front body 212*a* defining a surface in contact with the cover panel 200, a rear body 212*b* spaced apart from the front body 212*a* at a predetermined interval, and a connecting body 212*c* connecting the front body 212*a* and the rear body 212*b*. As the connecting body 212*c* is narrower in width than the front body 212*a* and the rear body 212*b*, the guide groove 214 may be formed between the front body 212*a* and the rear body 212*b*. The guide groove 214 may be formed on both sides of the connecting body 212*c*. The guide groove 214 is formed on both sides of the holder body 212 in the lengthwise direction of the door.

Referring to FIG. 12A, fixing grooves 215 are formed on upper and lower sides of the connecting body 212*c*, respectively. The fixing grooves 215 formed on the upper and lower sides of the connecting body 212*c* may have the same shape. This is to prevent wrong assembly during the process of coupling to the cover panel 200.

The front body 212*a* and the rear body 212*b* extend upward and downward of the connecting body 212*c* to define the fixing grooves 215 therebetween. A separation interval between the front body 212*a* and the rear body 212*b* increases with an increase in distance from the connecting body 212*c*.

The connecting body 212*c* may have a shape inclined toward a center from an upper end 212*c*1 and a lower end 212*c*2. Accordingly, even when the holder 210*au*, 210*bu*, 210*ad*, 210*bd* is fastened to the cover panel 200 in a partially inclined state, the holder 210*au*, 210*bu*, 210*ad*, 210*bd* may be mounted on the upper guide 184 or the lower guide 186 to move up and down in the lengthwise direction Lu-Ld of the door.

The connecting body 212*c* may be provided with a fastening hole 216 therein for fastening the cover panel 200, and a reinforcing rib 218 for reinforcing rigidity around the fastening hole 216.

A thickness of the front body 212*a* may be less than a thickness of the rear body 212*b*. The less the thickness of the front body 212*a*, the smaller a gap between the cover panel 200 and the outer door 120. A rear body groove 212*d*, which is hollow, may be formed inside the rear body 212*b*.

Figure 14:
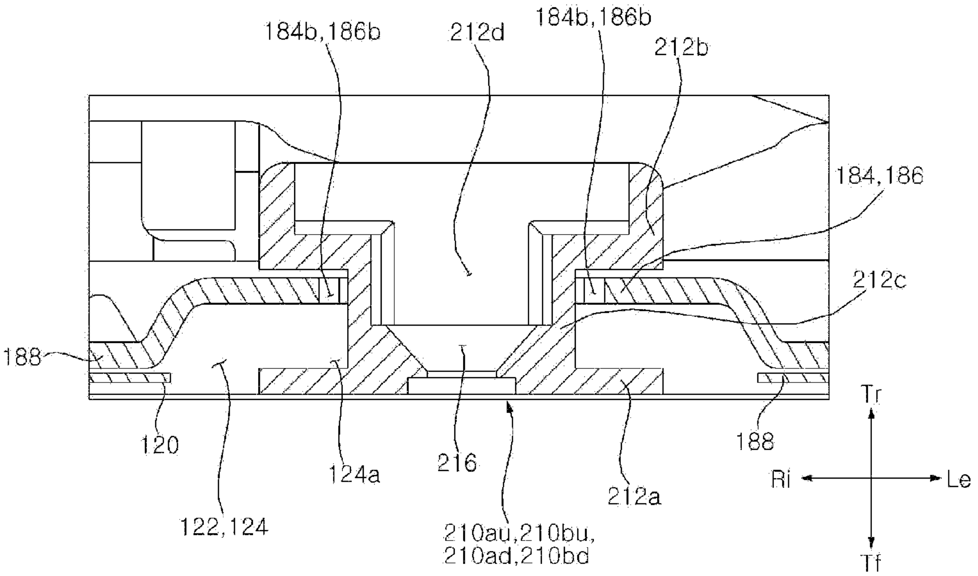
FIG. 14 is a cross-sectional view illustrating a state in which a lower holder is mounted on a lower guide and a second door bracket, according to an embodiment of the present disclosure.

Referring to FIG. 14, the second door bracket 180 of the outer door 120 is inserted into the guide groove 214 of the holder 210*au*, 210*bu*, 210*ad*, 210*bd*. The second door bracket 180 of the outer door 120 is inserted into the guide groove 214 formed on both sides of the lower holder 210*ad*, 210*bd*.

The second door bracket 180 is fastened to the first door bracket 162, and the first door bracket 162 is connected to the tub 10 and the door fixing part 380 to thereby support a load of the cover panel 200.

The cover panel fastening member 220*a*, 220*b* may include a pair of cover panel fastening members 220*a* and 220*b* connected to a pair of link modules 300*a* and 300*b*, respectively. The cover panel fastening member 220*a*, 220*b* may be fastened to the rear surface of the cover panel 200 through a separate fastening member (not shown). In addition, the cover panel fastening member 220*a*, 220*b* may be fastened to the link holder-fastening portion 346 of the link holder 340 through a separate fastening member. The cover panel fastening member 220*a*, 220*b* may move a position of the cover panel 200 according to a change in arrangement of the link module 300*a*, 300*b*.

The cover panel fastening member 220*a*, 220*b* includes a panel fastening body 222 that defines a surface opposite to the cover panel 200 and is fastened to the cover panel 200 with a separate fastening member (not shown), and a link fastening body 224 that defines a surface perpendicular to a surface of the panel fastening body 222 fastened to the cover panel 200 and is fastened to the link holder 340.

The panel fastening body 222 may be provided with a panel fastening body hole 222*a* into which a separate fastening member is inserted. The link fastening body 224 may be provided with a link fastening body hole 224*a* formed at the rear of the panel fastening body 222 and though which the link holder 340 is fastened with a separate fastening member (not shown).

The cover panel fastening member 220*a*, 220*b* moves in the lengthwise direction Lu-Ld of the door along the fastening member moving groove 128*a*, 128*b* disposed on a lower side of the outer door 120 or formed on the outer door 120. The cover panel fastening member 220*a*, 220*b* transmits a force, to the cover panel 200, due to a change in arrangement of the link module 300*a*, 300*b* according to the rotation of the door 100. When the cover panel 200 is moved by the cover panel fastening member 220, the cover panel 200 may move up and down in the lengthwise direction Lu-Ld of the door by the upper holders 210*au* and 210*bu* mounted on the upper guide 184 of the second door bracket 180 and the lower holders 210*ad* and 210*bd* mounted on the lower guide 186 of the second door bracket 180.

Although preferred embodiments of the present disclosure have been shown and described herein, the present disclosure is not limited to the specific embodiments described above. It will be understood that various modifications and changes can be made by those skilled in the art without departing from the idea and scope of the present disclosure as defined by the appended claims. Therefore, it shall be considered that such modifications, changes, and equivalents thereof are all included within the scope of the present disclosure.

The invention claimed is:

1. A dishwasher comprising:

a tub that defines a space configured to receive objects to be washed, the tub having an open side;

a base that is disposed below the tub and supports the tub at a position spaced apart from a floor surface;

a door configured to open and close the open side of the tub;

a door bracket coupled to the door and rotatably connected to the tub;

a cover panel configured to move relative to the door in a lengthwise direction of the door based on rotation of the door;

a link that enables the cover panel to move relative to the door in the lengthwise direction of the door;

an upper holder coupled to a first side of the cover panel and movably disposed at the door bracket; and a lower holder spaced apart from the upper holder and coupled to the first side of the cover panel, the lower holder being movably disposed at the door bracket, wherein the door bracket comprises:

an upper guide configured to guide movement of the upper holder, and a lower guide that is disposed below the upper guide and configured to guide movement of the lower holder.

2. The dishwasher of claim 1, wherein the door comprises:

an inner door that is configured to contact a front surface of the tub and close the open side of the tub; and an outer door that is coupled to a front of the inner door, and wherein the upper guide and the lower guide of the door bracket are disposed between the inner door and the outer door.

3. The dishwasher of claim 2, wherein one side of the door bracket is coupled to the inner door, and another side of the door bracket is coupled to the outer door.

4. The dishwasher of claim 2, wherein the door bracket comprises:

a bracket front surface that defines the upper guide and the lower guide; and an inner door fastening portion disposed at an upper portion of the bracket front surface and coupled to the inner door.

5. The dishwasher of claim 4, wherein the inner door fastening portion is bent from the bracket front surface and extends rearward to the inner door in a thickness direction of the door.

6. The dishwasher of claim 4, wherein the inner door defines a door bracket fastening groove recessed rearward from the front surface of the inner door, and wherein the inner door fastening portion is inserted into the door bracket fastening groove and fastened to the inner door.

7. The dishwasher of claim 4, wherein the bracket front surface comprises an outer door fastening portion that is disposed between the upper guide and the lower guide and fastened to the outer door.

8. The dishwasher of claim 2, wherein the outer door defines:

an upper hole that is open toward a front of the upper guide and extends in a movement direction of the cover panel; and a lower hole that is open toward a front of the lower guide and extends in the movement direction of the cover panel.

9. The dishwasher of claim 8, wherein the upper guide comprises an upper guide hole configured to guide the movement of the upper holder, wherein the lower guide comprises a lower guide hole configured to guide the movement of the lower holder, wherein a size of the upper hole of the outer door is greater than a size of the upper guide hole to thereby allow the upper holder to move along the upper guide hole without contacting the outer door, and wherein a size of the lower hole is greater than a size of the lower guide hole to thereby allow the lower holder to move along the lower guide hole without contacting the outer door.

10. The dishwasher of claim 2, wherein the door bracket comprises:

a first door bracket that is coupled to the inner door and rotatably connected to the tub; and a second door bracket that is connected to the first door bracket and coupled to the outer door.

11. The dishwasher of claim 10, wherein the second door bracket comprises:

a bracket front surface that defines the upper guide and the lower guide;

a bracket fastening portion disposed at a lower portion of the bracket front surface and coupled to the first door bracket; and an inner door fastening portion disposed at an upper portion of the bracket front surface and coupled to the inner door, and wherein the second door bracket has (i) an upper end that is coupled to the inner door and (ii) a lower end that is coupled to the inner door through the first door bracket.

12. The dishwasher of claim 10, wherein the first door bracket comprises:

a tub connecting portion disposed at a lower end of the tub and rotatably connected to the tub;

a door fastening portion that extends upward from the tub connecting portion in the lengthwise direction of the door and is coupled to the inner door; and a link connecting portion that is disposed rearward relative to the tub connecting portion in a thickness direction of the door and connected to the link.

13. The dishwasher of claim 2, wherein the door further comprises an upper cover door that is disposed at the outer door and coupled to the inner door, the upper cover door being disposed rearward relative to the cover panel, and wherein the door bracket is disposed at a lower side of the upper cover door.

14. The dishwasher of claim 1, wherein the upper guide and the lower guide are spaced apart from each other in the lengthwise direction of the door, and wherein a distance between the upper guide and the lower guide is greater than or equal to a vertical length of the upper guide or the lower guide.

15. The dishwasher of claim 1, wherein the upper guide comprises:

an upper insertion hole configured to receive the upper holder; and an upper guide hole that extends downward from the upper insertion hole and is configured to guide the movement of the upper holder, and wherein the lower guide comprises:

a lower insertion hole configured to receive the lower holder, and a lower guide hole that extends downward from the lower insertion hole and is configured to guide the movement of the lower holder.

16. The dishwasher of claim 15, wherein the door comprises:

an inner door that is configured to contact a front surface of the tub and close the open side of the tub; and an outer door that is coupled to a front of the inner door, and wherein the door bracket is disposed between the inner door and the outer door.

17. The dishwasher of claim 16, wherein the door bracket defines an outer door fastening hole disposed between the upper guide hole and the lower insertion hole and coupled to the outer door.

18. The dishwasher of claim 1, wherein the upper guide is a hole that receives the upper holder, and the lower guide is another hole that receives the lower holder.

19. The dishwasher of claim 1, further comprising a link module that connects the door bracket to the cover panel, the link module comprising a plurality of links including the link.

20. The dishwasher of claim 1, further comprising a tub bracket disposed at a lower portion of the tub, wherein the link rotatably connects the door bracket to the tub bracket.

* * * * *